(12) United States Patent
Sheets et al.

(10) Patent No.: US 7,577,816 B2
(45) Date of Patent: Aug. 18, 2009

(54) REMOTE TRANSLATION MECHANISM FOR A MULTINODE SYSTEM

(75) Inventors: Kitrick Sheets, Cary, NC (US); Andrew B. Hastings, Eagan, MN (US)

(73) Assignee: Cray Inc., Seattle, WA (US)

( * ) Notice: Subject to any disclaimer, the term of this patent is extended or adjusted under 35 U.S.C. 154(b) by 162 days.

(21) Appl. No.: 10/643,758

(22) Filed: Aug. 18, 2003

(65) Prior Publication Data

US 2005/0044340 A1    Feb. 24, 2005

(51) Int. Cl.
*G06F 12/08* (2006.01)

(52) U.S. Cl. .................. 711/206; 711/205; 711/207

(58) Field of Classification Search .................. 711/206, 711/207, 148, 205
See application file for complete search history.

(56) References Cited

U.S. PATENT DOCUMENTS

| RE28,577 E | 10/1975 | Schmidt |
|---|---|---|
| 4,412,303 A | 10/1983 | Barnes et al. |
| 4,414,624 A | 11/1983 | Summer, Jr. et al. |
| 4,541,046 A | 9/1985 | Nagashima et al. |
| 4,888,679 A | 12/1989 | Fossum et al. |
| 4,989,131 A | 1/1991 | Stone |
| 5,012,409 A | 4/1991 | Fletcher et al. |
| 5,068,851 A | 11/1991 | Bruckert et al. |
| 5,197,130 A | 3/1993 | Chen et al. |
| 5,247,635 A | 9/1993 | Kamiya |
| 5,247,691 A | 9/1993 | Sakai |
| 5,341,482 A | 8/1994 | Cutler et al. |
| 5,375,223 A | 12/1994 | Meyers et al. |
| 5,418,916 A | 5/1995 | Hall et al. |
| 5,430,850 A | 7/1995 | Papadopoulos et al. |
| 5,430,884 A | 7/1995 | Beard et al. |

(Continued)

FOREIGN PATENT DOCUMENTS

EP    0353819 A2    2/1990

(Continued)

OTHER PUBLICATIONS

Abts, D., "So Many States, So Little Time: Verifying Memory Coherence in the Cray X1", *Parallel and Distributed Processing Symposium*, (Apr. 22, 2003),11-20.

(Continued)

*Primary Examiner*—Sheng-Jen Tsai
(74) *Attorney, Agent, or Firm*—Schwegman, Lundberg & Woessner, P.A.

(57) ABSTRACT

The present invention provides a method of initializing shared memory in a multinode system. The method includes building a local address space in each of a plurality of nodes and exporting the local address space from each of the plurality of nodes to a Remote Translation Table (RTT) in each of the plurality of nodes. The present invention further provides system including a plurality of nodes, each node having one or more processors and a memory controller operatively coupled to the one or more processors, wherein the memory controller includes a RTT for holding translation information for an entire virtual memory address space for the node, further wherein the RTT is initialized upon the start of a process by building a local address space in the node, and exporting the local address space from the node to a RTT in each of the plurality of other nodes.

22 Claims, 11 Drawing Sheets

U.S. PATENT DOCUMENTS

| | | |
|---|---|---|
| 5,446,915 A | 8/1995 | Pierce |
| 5,530,933 A | 6/1996 | Frink et al. |
| 5,560,029 A | 9/1996 | Papadopoulos et al. |
| 5,606,696 A | 2/1997 | Ackerman et al. |
| 5,613,114 A | 3/1997 | Anderson et al. |
| 5,640,524 A | 6/1997 | Beard et al. |
| 5,649,141 A | 7/1997 | Yamazaki |
| 5,684,977 A | 11/1997 | Van Loo et al. |
| 5,717,895 A | 2/1998 | Leedom et al. |
| 5,721,921 A | 2/1998 | Kessler et al. |
| 5,765,009 A | 6/1998 | Ishizaka |
| 5,781,775 A | 7/1998 | Ueno |
| 5,787,494 A | 7/1998 | Delano et al. |
| 5,796,980 A | 8/1998 | Bowles |
| 5,812,844 A | 9/1998 | Jones et al. |
| 5,835,951 A | 11/1998 | McMahan |
| 5,860,146 A * | 1/1999 | Vishin et al. ............... 711/207 |
| 5,897,664 A | 4/1999 | Nesheim et al. |
| 5,978,830 A | 11/1999 | Nakaya et al. |
| 5,987,571 A | 11/1999 | Shibata et al. |
| 5,995,752 A | 11/1999 | Chao et al. |
| 6,003,123 A | 12/1999 | Carter et al. |
| 6,014,728 A | 1/2000 | Baror |
| 6,047,323 A | 4/2000 | Krause |
| 6,088,701 A | 7/2000 | Whaley et al. |
| 6,101,590 A | 8/2000 | Hansen |
| 6,105,113 A * | 8/2000 | Schimmel .................. 711/146 |
| 6,161,208 A | 12/2000 | Dutton et al. |
| 6,247,169 B1 | 6/2001 | DeLong |
| 6,269,390 B1 | 7/2001 | Boland |
| 6,269,391 B1 | 7/2001 | Gillespie |
| 6,308,250 B1 | 10/2001 | Klausler |
| 6,308,316 B1 | 10/2001 | Hashimoto et al. |
| 6,317,819 B1 | 11/2001 | Morton |
| 6,339,813 B1 | 1/2002 | Smith, III et al. |
| 6,356,983 B1 | 3/2002 | Parks |
| 6,389,449 B1 | 5/2002 | Nemirovsky et al. |
| 6,430,649 B1 | 8/2002 | Chaudhry et al. |
| 6,490,671 B1 | 12/2002 | Frank et al. |
| 6,496,902 B1 | 12/2002 | Faanes et al. |
| 6,496,925 B1 | 12/2002 | Rodgers et al. |
| 6,519,685 B1 | 2/2003 | Chang |
| 6,553,486 B1 | 4/2003 | Ansari |
| 6,591,345 B1 | 7/2003 | Seznec |
| 6,615,322 B2 * | 9/2003 | Arimilli et al. ............... 711/145 |
| 6,665,774 B2 | 12/2003 | Faanes et al. |
| 6,684,305 B1 | 1/2004 | Deneau |
| 6,782,468 B1 | 8/2004 | Nakazato |
| 6,816,960 B2 | 11/2004 | Koyanagi |
| 6,910,213 B1 | 6/2005 | Hirono et al. |
| 6,922,766 B2 * | 7/2005 | Scott ........................ 711/202 |
| 6,925,547 B2 * | 8/2005 | Scott et al. .................. 711/207 |
| 6,952,827 B1 | 10/2005 | Alverson et al. |
| 6,976,155 B2 | 12/2005 | Drysdale et al. |
| 7,028,143 B2 | 4/2006 | Barlow et al. |
| 7,089,557 B2 | 8/2006 | Lee |
| 7,103,631 B1 | 9/2006 | van der Veen |
| 7,111,296 B2 | 9/2006 | Wolrich et al. |
| 7,137,117 B2 | 11/2006 | Ginsberg |
| 7,143,412 B2 | 11/2006 | Koenen |
| 7,162,713 B2 | 1/2007 | Pennello |
| 7,191,444 B2 | 3/2007 | Alverson et al. |
| 7,334,110 B1 | 2/2008 | Faanes et al. |
| 7,366,873 B1 | 4/2008 | Kohn |
| 7,421,565 B1 | 9/2008 | Kohn |
| 7,437,521 B1 | 10/2008 | Scott et al. |
| 2002/0078122 A1 | 6/2002 | Joy et al. |
| 2002/0091747 A1 | 7/2002 | Rehg et al. |
| 2002/0116600 A1 | 8/2002 | Smith et al. |
| 2002/0169938 A1 | 11/2002 | Scott et al. |
| 2002/0172199 A1 | 11/2002 | Scott et al. |
| 2003/0005380 A1 | 1/2003 | Nguyen et al. |
| 2003/0097531 A1 | 5/2003 | Arimilli et al. |
| 2003/0167383 A1 | 9/2003 | Gupta et al. |
| 2004/0044872 A1 * | 3/2004 | Scott ........................ 711/202 |
| 2004/0064816 A1 | 4/2004 | Alverson et al. |
| 2004/0162949 A1 | 8/2004 | Scott et al. |
| 2005/0044128 A1 | 2/2005 | Scott et al. |
| 2005/0044339 A1 * | 2/2005 | Sheets ........................ 711/206 |
| 2005/0125801 A1 | 6/2005 | King |

FOREIGN PATENT DOCUMENTS

| | | |
|---|---|---|
| EP | 0473452 A2 | 3/1992 |
| EP | 0475282 A2 | 3/1992 |
| EP | 0501524 A2 | 9/1992 |
| EP | 0570729 A2 | 11/1993 |
| WO | WO-87/01750 A1 | 3/1987 |
| WO | WO-88/08652 A1 | 11/1988 |
| WO | WO-95/16236 A1 | 6/1995 |
| WO | WO-96/10283 A1 | 4/1996 |
| WO | WO-96/32681 A1 | 10/1996 |

OTHER PUBLICATIONS

Chen, Y., et al., "UTLB: A Mechanism for Address Translation on Network Interfaces", *Proceedings of the Eighth International Conference on Architectural Support for Programming Languages and Operating Systems (ASPLOS)*, (1998),193-204.

Faanes, G. J., et al., "Decoupled Vector Architecture", U.S. Appl. No. 10/643,586, filed Aug. 18, 2003, 47 pages.

Gharachorloo, Kourosh, "Two Techniques to Enhance the Performance of Memory Consistency Models", *Proceedings of the International Conference on Parallel Processing*, (1991),1-10.

Hennessy, J. L., *Computer Architecture A Quantitative Approach, Second Edition*, Morgan Kaufman Publishers, Inc., (1996),39-41.

Kontothanassis, L., et al., "VM-based shared memory on low-latency, remote-memory-access networks", *Proceedings of the ACM ISCA '97*, (1997),157-169.

Scott, S. L., "Decoupled Store Address and Data In A Multiprocessor System", U.S. Appl. No. 10/643,742, filed Aug. 18, 2003, 27 Pages.

Scott, S. L., "Latency Tolerant Distributed Shared Memory Multiprocessor Computer", U.S. Appl. No. 10/643,585, filed Aug. 18, 2003, 17 Pages.

Scott, S. L., et al., "Multistream Processing Memory-and Barrier-Synchronization Method and Apparatus", U.S. Appl. No. 10/643,741, filed Aug. 18, 2003, 143 pages.

Scott, S. L., et al., "Relaxed Memory Consistency Model", U.S. Appl. No. 10/643,754, filed Aug. 18, 2003, 144 Pages.

Scott, S., "Synchronization and Communication in the T3E Multiprocessor", *ASPLOS*, vol. II, (1996),pp. 26-36.

Sheets, K., et al., "Remote-Translation Mechanism for a Multinode System", U.S. Appl. No. 10/643,758, filed Aug. 18, 2003, 42 Pages.

Wood, D. A., et al., "An in-cache address translation mechanism", *Proceedings of the 13th annual international symposium on Computer architecture*, (1986),358-365.

"Cray Assembly Language (CAL) for Cray X1™ Systems Reference Manual", *Section 2.6, Memory Ordering*, http://docs.cray.com/books/S-2314-51/index.html, (Jun. 2003), 302 pgs.

"ECPE 4504: Computer Organization Lecture 12: Computer Arithmetic", The Bradley Department of Electrical Engineering, (Oct. 17, 2000), 12 pgs.

"Msync—Synchronise Memory with Physical Storage", *The Single UNIX Â?Â® Specification, Version 2: Msync, The Open Group*, http://www.opengroup.org/onlinepubs/007908799/xsh/msync.html, (1997), 3 pgs.

Cohoon, J., et al., *C++ Program Design*, McGraw-Hill Companies Inc., 2nd Edition, (1999), p. 493.

Ernst, D., et al., "Cyclone: A Broadcast-Free Dynamic Instruction Scheduler with Selective Replay", *30th Annual International Symposium on Computer Architecture (ISCA-2003)*, (Jun. 2003), 10 pgs.

Patterson, D. A., et al., *Computer Architecture: A Quantitative Approach*, 2nd Edition, Morgan Kaufmann Publishers, Inc., San Francisco, CA,(1996), 699-708.

Patterson, D. A., et al., *Computer Architecture: A Quantitative Approach*, 2nd Edition, Morgan Kaufmann Publishers, Inc., San Francisco, CA,(1996), 179-187, 373-384.

Patterson, D. A., et al., *Computer Architecture: A Quantitative Approach*, 2nd Edition, Morgan Kaufmann Publishers, Inc., San Francisco, CA, (1996), 194-197.

Patterson, D. , et al., "Computer Architecture: A Quantitative Approach", Second Edition, Morgan Kaufmann Publishers Inc. ,(1996),251-256.

U.S. Appl. No. 10/235,898, Non Final Office Action mailed Jul. 7, 2004, 12 pgs.

U.S. Appl. No. 10/235,898, Notice of Allowance mailed Mar. 15, 2005, 4 pgs.

U.S. Appl. No. 10/235,898, Amendment and Response filed Jan. 6, 2005 to Non Final Office Action mailed Jul. 7, 2004, 16 pgs.

U.S. Appl. No. 10/643,574, Non-Final Office Action mailed Aug. 7, 2007, 31 pgs.

U.S. Appl. No. 10/643,574, Advisory Action mailed May 21, 2007, 3 pgs.

U.S. Appl. No. 10/643,574, Final Office Action mailed Mar. 5, 2007, 31 pgs.

U.S. Appl. No. 10/643,574, Non-Final Office Action mailed Jan. 30, 2006, 33 pgs.

U.S. Appl. No. 10/643,574, Non-Final Office Action mailed Jul. 28, 2006, 30 pgs.

U.S. Appl. No. 10/643,574, RCE and Response Under 37 C.F.R. 1.116 filed Jul. 12, 2007 to Final Office Action mailed Mar. 5, 2007, 19 pgs.

U.S. Appl. No. 10/643,574, Response filed Nov. 28, 2006 to Non-Final Office Action mailed Jul. 28, 2006, 15 pgs.

U.S. Appl. No. 10/643,574, Response filed May 1, 2006 to Non-Final Office Action mailed Jan. 30, 2006, 29 pgs.

U.S. Appl. No. 10/643,574, Response filed May 4, 2007 to Final Office Action mailed Mar. 5, 2007, 15 pgs.

U.S. Appl. No. 10/643,585, Advisory Action mailed Apr. 2, 2007, 3 pgs.

U.S. Appl. No. 10/643,585, Advisory Action mailed Aug. 14, 2006, 3 pgs.

U.S. Appl. No. 10/643,585, Amendment and Response filed Dec. 4, 2006 to Office Action mailed Oct. 23, 2006, 17 pgs.

U.S. Appl. No. 10/643,585, Amendment and Response filed Mar. 22, 2007 to Final Office Action mailed Jan. 25, 2007, 23 pgs.

U.S. Appl. No. 10/643,585, Amendment and Response filed Mar. 27, 2006 to Non-Final Office Action mailed Sep. 26, 2005, 7 pgs.

U.S. Appl. No. 10/643,585, Amendment and Response filed Aug. 3, 2006 to Final Office Action mailed Apr. 14, 2006, 9 pgs.

U.S. Appl. No. 10/643,585, Final Office Action mailed Jan. 25, 2007, 17 pgs.

U.S. Appl. No. 10/643,585, Final Office Action mailed Apr. 14, 2006, 13 pgs.

U.S. Appl. No. 10/643,585, Non-Final Office Action mailed Oct. 23, 2006, 12 pgs.

U.S. Appl. No. 10/643,585, Non-Final Office Action mailed Sep. 26, 2005, 9 pgs.

U.S. Appl. No. 10/643,585, Notice of Allowance mailed Jun. 11, 2007, 6 pgs.

U.S. Appl. No. 10/643,585, RCE and Amendment and Response filed Apr. 23, 2007 to Final Office Action mailed Jan. 25, 2007 and the Advisory Action mailed Apr. 2, 2007, 15 pgs.

U.S. Appl. No. 10/643,585, Request for Continued Examination filed Sep. 14, 2006, 1 pg.

U.S. Appl. No. 10/643,585, Response to Rule 312 Communication mailed Jul. 23, 2007, 2 pgs.

U.S. Appl. No. 10/643,586, Advisory Action mailed Jan. 18, 2007, 3 pgs.

U.S. Appl. No. 10/643,586, Final Office Action mailed Oct. 19, 2006.

U.S. Appl. No. 10/643,586, Non-Final Office Action mailed Feb. 8, 2006, 21 pgs.

U.S. Appl. No. 10/643,586, Non-Final Office Action mailed May 2, 2007, 36 pgs.

U.S. Appl. No. 10/643,586, RCE and Amendment and Response filed Feb. 16, 2007 to Final Office Action mailed Oct. 19, 2006 and the Advisory Action mailed Jan. 18, 2007, 19 pgs.

U.S. Appl. No. 10/643,586, Response filed Jan. 5, 2007 to Final Office Action mailed Oct. 19, 2006, 22 pgs.

U.S. Appl. No. 10/643,586, Response filed Aug. 1, 2006 to Non-Final Office Action Mailed Feb. 8, 2006, 24 pgs.

U.S. Appl. No. 10/643,587, Amendment and Response filed Aug. 13, 2007 to Non-Final Office Action mailed May 8, 2007, 20 pgs.

U.S. Appl. No. 10/643,587, Non-Final Office Action mailed May 8, 2007, 14 pgs.

U.S. Appl. No. 10/643,727, Non-Final Office Action mailed Feb. 16, 2006, 33 pgs.

U.S. Appl. No. 10/643,727, Non-Final Office Action mailed Aug. 11, 2006, 29 pgs.

U.S. Appl. No. 10/643,727, Notice of Allowance mailed Feb. 28, 2007 5 pgs.

U.S. Appl. No. 10/643,727, Notice of Allowance mailed Jul. 19, 2007, 5 pgs.

U.S. Appl. No. 10/643,727, Response filed Jan. 11, 2007 to Non-Final Office Action mailed Aug. 11, 2006, 15 pgs.

U.S. Appl. No. 10/643,727, Response filed Jun 15, 2006 to Non-Final Office Action mailed Feb. 16, 2006, 21 pgs.

U.S. Appl. No. 10/643,738 Response filed Jan. 16, 2006 Non-Final Office Action mailed Sep. 26, 2005, 13 pgs.

U.S. Appl. No. 10/643,738 Response filed Jun. 19, 2006 to Non-Final Office Action mailed Feb.17, 2006, 10 pgs.

U.S. Appl. No. 10/643,738, Final Office Action mailed Apr. 17, 2007, 12 pgs.

U.S. Appl. No. 10/643,738, Non-Final Office Action mailed Feb. 17, 2006, 9 pgs.

U.S. Appl. No. 10/643,738, Non-Final Office Action mailed Sep. 26, 2005, 11 pgs.

U.S. Appl. No. 10/643,738, Response filed Jul. 17, 2007 to Final Office Action mailed Apr. 17, 2007, 17 pgs.

U.S. Appl. No. 10/643,741, Non-Final Office Action mailed Apr. 5, 2007, 19 pgs.

U.S. Appl. No. 10/643,741, Response filed Jun. 4, 2007 to Non-Final Office Action mailed Apr. 5, 2007, 16 pgs.

U.S. Appl. No. 10/643,742, Non-Final Office Action mailed Jun. 4, 2007, 13 pgs.

U.S. Appl. No. 10/643,754, Advisory Action mailed Nov. 22, 2006, 3 pgs.

U.S. Appl. No. 10/643,754, Final Office Action mailed Sep. 14, 2006, 21 pgs.

U.S. Appl. No. 10/643,754, Non-Final Office Action mailed Feb. 8, 2006, 16 pgs.

U.S. Appl. No. 10/643,754, Non-Final Office Action mailed Jul. 5, 2007, 23 pgs.

U.S. Appl. No. 10/643,754, Response filed Nov. 7, 2006 to Final Office Action mailed Sep. 14, 2006, 12 pgs.

U.S. Appl. No. 10/643,754, Response filed Mar. 30, 2007 to Final Office Action mailed Nov. 22, 2006, 10 pgs.

U.S. Appl. No. 10/643,754, Response filed Jul. 10, 2006 to Non-Final Office Action mailed Feb. 8, 2006, 12 pgs.

U.S. Appl. No. 10/643,769 Response filed Jul. 23, 2007 to Non-Final Office Action mailed Apr. 23, 2007, 12 pgs.

U.S. Appl. No. 10/643,769, Non-Final Office Action mailed Apr. 23, 2007, 13 pgs.

U.S. Appl. No. 10/643,574, Response filed Nov. 7, 2007 to Non-final Office Action mailed Aug. 7, 2007, 15 pgs.

U.S. Appl. No. 10/643,586 Response to Non-Final Office Action filed Sep. 4, 2007, 18 pgs.

U.S. Appl. No. 10/643,587, Final Office Action mailed Oct. 31, 2007, FOAR, 19 pgs.

U.S. Appl. No. 10/643,738, Non-Final Office Action mailed Nov. 1, 2007, 19 pgs.

U.S. Appl. No. 10/643,741 Final Office Action mailed Sep. 11, 2007, 27 pgs.

U.S. Appl. No. 10/643,742, Response filed Oct. 11, 2007 to Non-final Office Action mailed Jun. 4, 2007, 18 pages.

U.S. Appl. No. 10/643,754, Amendment & Response filed Oct. 9, 2007 to Non-final OA mailed Jul. 5, 2007, 14 pages.

U.S. Appl. No. 10/643,769, Notice of Allowance Mailed Oct. 29, 2007, 17 pgs.

Gail, et al., Tera Hardware-Software are cooperation, *ACM*, FOAR, (1997), 1-16 pgs.

U.S. Appl. No. 10/643,574 Response filed Jul. 12, 2007 to Advisory Action mailed Mar. 5, 2007, 16 pgs.

U.S. Appl. No. 10/643,586 Response filed Feb. 16, 2007 to Advisory Action mailed Oct. 19, 2006, 18 pgs.

U.S. Appl. No. 10/643,741, Notice of Allowance mailed Feb. 12, 2008, NOAR, 3 pgs.

U.S. Appl. No. 10/643,754, Amendment and Response filed Jan. 25, 2008 to Final Office Action mailed Nov. 25, 2007, 20 pgs.

U.S. Appl. No. 10/643,741 Supplemental Notice of Allowability mailed Mar. 25, 2008, SNOA, 2 pgs.

U.S. Appl. No. 10/643,754, Amendment and Response filed Mar. 26, 2008 to Final Office Action mailed Sep. 26, 2007, 12 pages.

U.S. Appl. No. 10/643,587, Non-Final Office Action mailed Jul. 9, 2008, 15 pgs.

U.S. Appl. No. 10/643587, Response filed Apr. 30, 2008 to Final Office Action mailed Oct. 31, 2007, 10 pgs.

U.S. Appl. No. 10/643,727, Notice of Allowance mailed Apr. 28, 2008, 5 pgs.

U.S. Appl. No. 10/643,738, Advisory Action mailed Jul. 31, 2007, 3 pgs.

U.S. Appl. No. 10/643,741, Notice of Allowance mailed Jun. 9, 2008, 9 pgs.

U.S. Appl. No. 10/643,742 Non-Final Office Action mailed Apr. 9, 2008, 12 pgs.

U.S. Appl. No. 10/643,754, Advisory Action mailed Feb. 8, 2008, 3 pgs.

U.S. Appl. No. 10/643,754, Non-Final Office Action mailed Jun. 25, 2008, 30 pgs.

U.S. Appl .no. 10/643,769, Notice of Allowance mailed Jun. 2, 2008, 5 pgs.

Handy, J., "The Cache Memory Book", *Academic Press*, (1993), 73-84.

U.S. Appl. No. 110/643,769: Notice of Allowance mailed Oct. 29, 2008, 2 pgs.

U.S. Appl. No. 10/643,742: Final Office Action mailed Dec. 12, 2008., 10 pgs.

"U.S. Appl. No. 10/643,585 Non-Final Office Action Mailed On Sep. 15, 2008", 14 pgs.

"U.S. Appl. No. 10/643,742, Response filed Oct. 9, 2008 to Non-Final Office Action mailed On Apr. 9, 2008", 15 pgs.

US 7,243,211, 07/2007, Kohn (withdrawn)

* cited by examiner

REMOTE TRANSLATION MECHANISM FOR A MULTINODE SYSTEM

RELATED INVENTION

The present invention is related to U.S. patent application Ser. No. 10/235,898, entitled "Remote Translation Mechanism for a Multi-Node System" filed on Sep. 4, 2002, which is incorporated in its entirety herein by reference.

FIELD OF THE INVENTION

The present invention relates generally to the field of computer memory systems, and more particularly to a remote translation mechanism for a multinode system.

BACKGROUND OF THE INVENTION

Multiprocessor computer systems include a number of processing nodes connected together by an interconnection network. Typically, each processing node includes one or more processors, a local memory, and an interface circuit connecting the node to the interconnection network. The interconnection network is used for transmitting packets of information between processing nodes. Distributed, shared-memory multiprocessor systems include a number of processing nodes that share a distributed memory element. By increasing the number of processing nodes, or the number of processors within each node, such systems can often be scaled to handle increased demand. In such a system, each processor is able to access local memory, or memory of other (remote) processing nodes. Typically, a virtual address is used for all memory accesses within a distributed, shared-memory multiprocessor system, and is translated into a physical address in the requesting node's translation look-aside buffer (TLB). Thus, the requesting node's TLB will need to contain address translation information for all the memory that the node is able to access (local or remote). This amount of address translation information can be substantial, and can result in much duplication of translation information throughout the multiprocessor system (e.g., if the same page of memory is accessed by 64 different nodes, the TLB used by each node will need to contain an entry for that page). This type of system does not scale efficiently to very large memories.

Therefore, there is a need for an address translation mechanism in a multi-processor system that addresses these and other shortcomings.

SUMMARY OF THE INVENTION

To address these and other needs, various embodiments of the present invention are provided. One embodiment of the invention provides a method for initializing shared memory in a multimode system. To build an application virtual address space, the method includes building a local address space in each of a plurality of nodes and exporting the local address space from each of the plurality of nodes to a Remote Translation Table (RTT) in each of the plurality of nodes.

The method further includes, once the application virtual address space is built on the RTT of each of the plurality of nodes and if remote translation is enabled, performing a virtual memory reference to a physical memory location using the application virtual address space in the local RTT in each of the plurality of nodes, wherein performing the virtual memory reference includes translating the node number of the virtual memory reference into a node address associated with a remote node associated with the local node through an application and translating bits of the virtual memory reference into a physical page address for the remote node in the application virtual address space;

Another embodiment of the invention provides a method for remotely translating a virtual memory address into a physical memory address in a multi-node system. When remote translation is not enabled, the method includes providing the virtual memory address at a source node, determining that the virtual memory address is to be sent to a remote node, sending the virtual memory address to the remote node, and translating the virtual memory address on the remote node into a physical memory address using the local virtual address space in a remote-translation table (RTT) on the remote node. The RTT contains translation information for an entire virtual memory address space associated with the remote node.

A further embodiment of the invention provides a method for translating a virtual memory address in a multi-node system. The method includes providing a virtual memory address on a local node by using a virtual address of a load or a store instruction, identifying a virtual node associated with the virtual memory address, and determining if the virtual node corresponds to the local node. If the virtual node corresponds to the local node, then the method includes translating the virtual memory address into a local physical memory address on the local node. If, instead, the virtual node corresponds to a remote node, then the method includes sending the virtual memory address to the remote node, and translating the virtual memory address into a physical memory address on the remote node. These and other embodiments will be described in the detailed description below.

DETAILED DESCRIPTION

Figure 1:
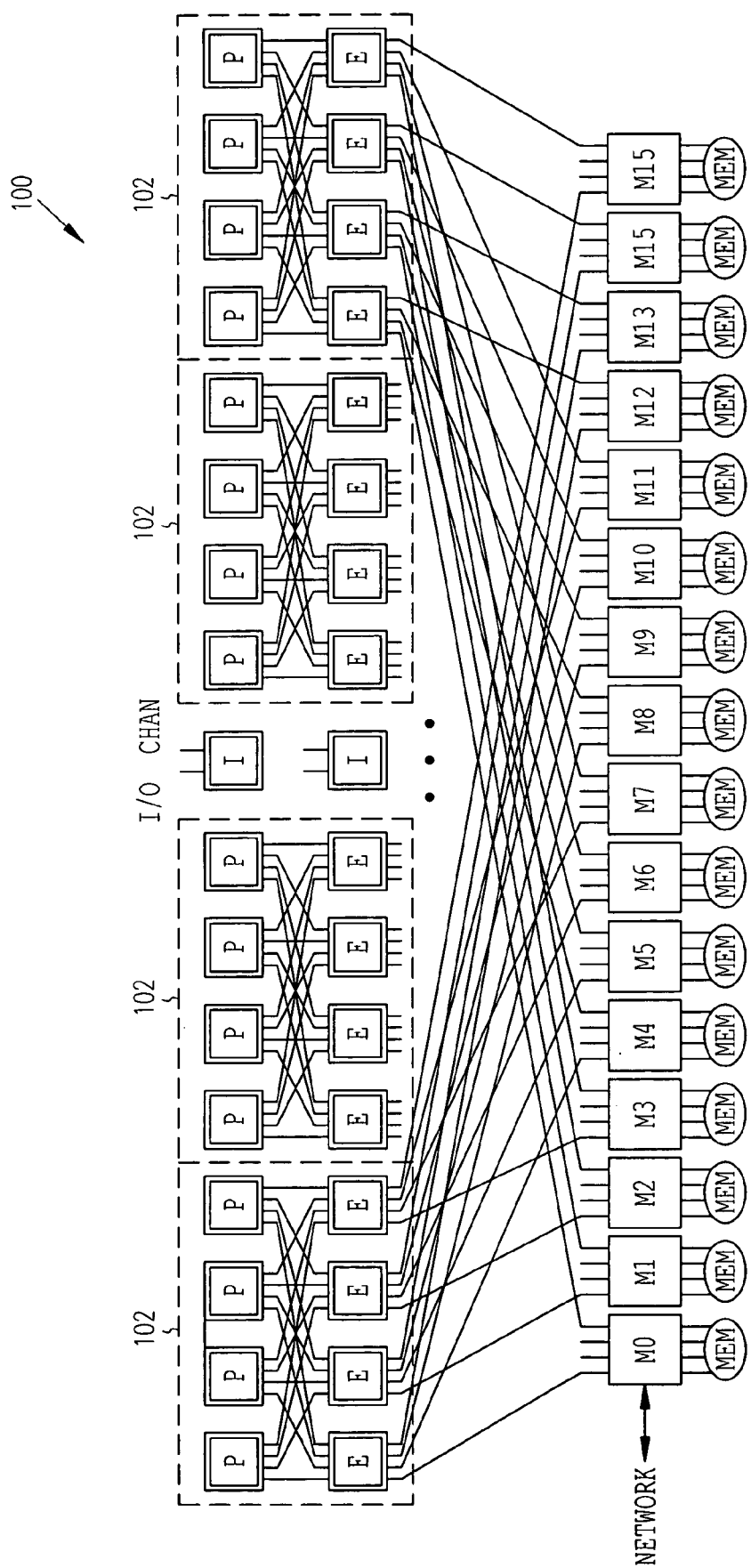
FIG. 1 illustrates a block diagram of a node that includes four multi-streaming processors, according to one embodiment of the present invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. The same reference number or label may refer to signals and connections, and the actual meaning will be clear from its use in the context of the description.

Various embodiments of the present invention provide a virtual-to-physical address translation mechanism for a shared-memory multiprocessor that scales efficiently to large numbers of processors. This mechanism supports a single virtual address format (e.g., using load or store instructions), and detects whether a reference for the instruction is to the local node or a remote node. If to a local node, or if remote translation is not enabled, the virtual to physical address translation is performed in the local translation look-aside buffer (TLB), producing a physical address that includes both the physical node number and the physical memory offset within that node. If remote translation is enabled, however, and the virtual address is for a remote node (as determined by comparing the virtual node field of the virtual address with the value representing the local virtual node number), then a remote address translation mechanism is used, as follows. A physical node number is determined by adding the virtual node field of the virtual address to a physical base node. The virtual node number is also checked against a limit value, to ensure that the request is within allowable bounds. The remainder of the virtual address forms a virtual offset, which is sent with the memory request to the destination physical node. A "global address space identifier" (GASID) is also looked up for the local processor and sent with the request. The GASID and the upper portion of the virtual address are used to index into a remote translation table (RTT) at the destination node, to produce a physical page number at the remote node. The RTT is sized to cover the entire virtual address space at a single node. The use of the GASID allows multiple applications, with overlapping virtual address ranges, to share memory on the same node while all using the remote translation mechanism. Essentially, the GASID forms a unique extension to the virtual address offset for each application.

The address translation mechanism of these embodiments scales to large system sizes, because each node keeps track of virtual to physical page mappings for its node only. The TLB is used for references to the local node by the local processor, and the RTT at a node is used for incoming references to the local node from remote nodes. A single virtual address format and access mechanism are used for both local and remote memory references. The use of remote translation is thus functionally transparent. The RTT keeps a full map of the remote virtual address space, and each node is able to manage its virtual-to-physical address mapping independently.

FIG. 1 illustrates a specific hardware environment in which various embodiments of the present invention may be practiced. It is to be noted that FIG. 1 illustrates only one example of a hardware environment, and other environments (for other embodiments) may also be used.

FIG. 1 illustrates a block diagram of a node that includes four multi-streaming processors (MSP's), according to one embodiment. In this embodiment, node 100 includes each MSP 102 in a four MSP system. Node 100 is contained on a single printed circuit board. The sixteen M chips on node 100 contain memory controllers, network interfaces and cache coherence directories with their associated protocol engines. The memory system is sliced across the 16 M chips, round robin by 32-byte cache lines. Each M chip supports one slice. Bits 5 and 6 of the physical address determine the E chip within a processor, and bits 7 and 8 further specify one of four M chips connected to each E chip.

Each M chip resides in one of sixteen independent address slices of the machine, and the interconnection network provides connectivity only between corresponding M chips on different nodes. All activity (cache, memory, network) relating to a line of memory stays within the corresponding slice. Each M chip controls a separate sector of a slice. Slices expand (get more memory in each) as nodes are added so the number of sectors in each slice is equal to the number of nodes in a system.

Total peak local memory bandwidth for one node is 204.8 GB/s, or 51.2 GB/s per MSP. As each MSP 102 needs a maximum bandwidth of about 45 GB/s, there is bandwidth to support network traffic and I/O without greatly impacting computational performance. Each M chip contains two network ports, each 1.6 GB/s peak per direction.

Node 100 also contains two I chip I/O controller ASIC's. These connect to the M chips and provide four I/O ports of 1.2 GB/s bandwidth, full duplex, off node 100. Each I chip contains two ports, 400 MB/s full duplex connections to 8 of the local M chips (one I chip connects to the even M chips and the other connects to the odd M chips), and a 1.6 GB/s full duplex connection to the other I chip. The total I/O bandwidth per module is thus 4.8 GB/s full duplex.

The memory on node 100 is distributed across the set of 16 M chips. Each M chip directly controls the resources contained on two daughter boards so that there are thirty two daughter boards on node 100. The memory chips in the daughter boards are Direct Rambus DRAM. These chips have 16 internal banks and have 18 data pins that each run, with a 400 MHz clock, at an 800 Mbaud rate. Each chip then has a 1.6 GB/s read/write data rate. Being 18 bits wide, additional parts to support ECC are not needed. Daughter cards contain 16 chips organized into 4 memory channels of 4 chips each. Each memory channel is independent. Channels have a peak data bandwidth of 1.6 GB/s, so that the card supports a bandwidth of 6.4 GB/s. With 16 banks in a memory chip, a channel has 64 memory banks. Daughter cards with 64 Mbit, 128 Mbit, 256 Mbit or 512 Mbit chips are supported. The design also accommodates chip densities of 1 Gbit if and when they become available, assuming they fit in the design envelope (size, power, etc.). As the memory parts are 18 bits wide instead of 16 in order to support ECC, the chip's bit densities are actually 72, 144, 288, 576 and 1152 Mbits.

Figure 2A:
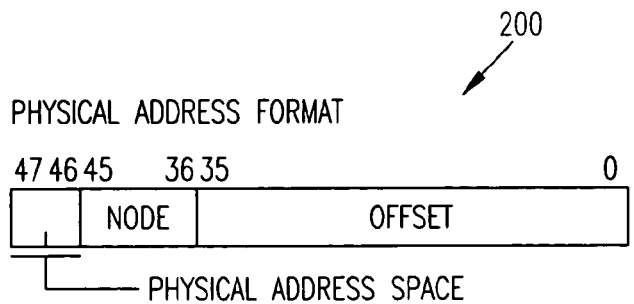
FIG. 2A illustrates a format for a physical memory address, according to one embodiment of the present invention.

FIG. 2A illustrates a format for a physical memory address, according to one embodiment. In this embodiment, a 46-bit (64 TBytes) physical memory address is supported. The node size for this embodiment is a board containing four MSP's and 16 M chips. Physical memory address format 200 contains bits 47..0. Bits 35..0 represent an offset (into memory). Bits 45..36 represent the node. Bits 47..46 represent the physical address space. The physical memory format allows for up to 1024 nodes (4096 MSP's) and 64 GBytes of physical memory per node. Physical pages are allocated on a per-node basis. That is, any given physical page is distributed uniformly across the 16 sectors (the memory controlled by a given M chip) of a single node. This embodiment provides three parallel, physical address spaces, which are selected by two extra bits at the top of the physical address.

Figure 2B:
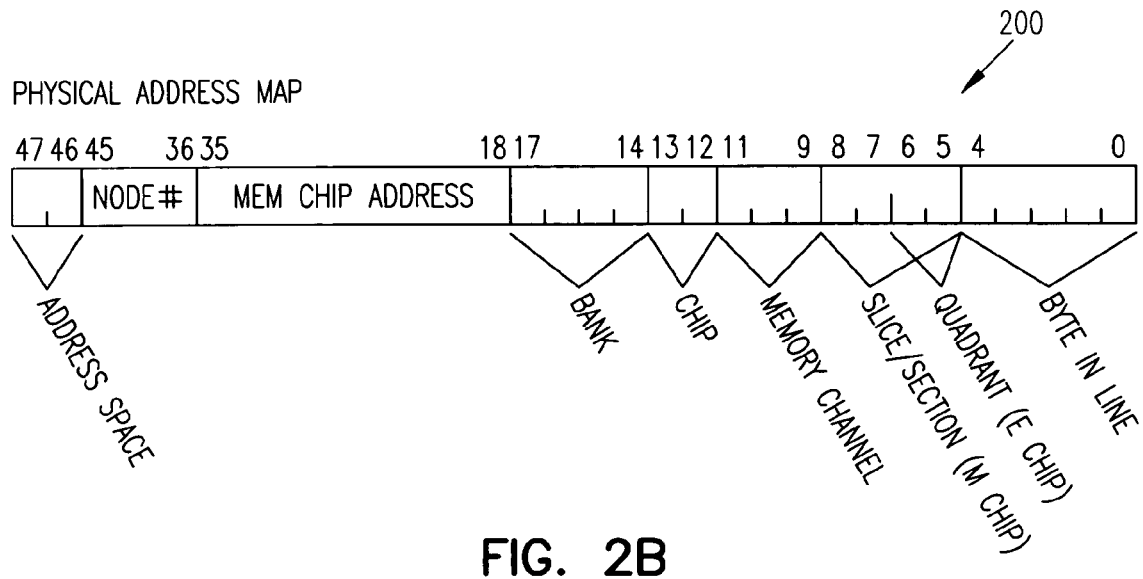
FIG. 2B illustrates a more detailed map of the physical memory address format shown in FIG. 2A, according to one embodiment of the present invention.

FIG. 2B illustrates a more detailed map of the physical memory address format shown in FIG. 2A, in one embodiment. The mapping of a physical address to a destination location is dependent on the hardware implementation (as opposed to being specified in the user-level architecture). Address mapping must be done so that parallelism can be easily exploited by having the map such that multiple transactions can be requested and satisfied simultaneously with minimum hardware complexity. Bits 4..0 represent the byte in the line. Bits 6..5 represent the quadrant (E chip). Bits 8..5 collectively represent the slice/section (M chip). Bits 11..9 represent the memory channel. Bits 13..12 represent the memory chip for the memory channel, and bits 17..14 represent the bank for the memory chip. Bits 35..18 represent the memory chip address, and bits 45..36 represent the node number (in the system). Bits 47..46 represent the address space. Memory size options and configuration changes (including memory degrades) can modify this map. The map supports memory chips up to 1 Gbit density. There are three address spaces: coherent main memory, memory-mapped register space, and I/O device space. Coherent main memory may be cached.

Figure 3:
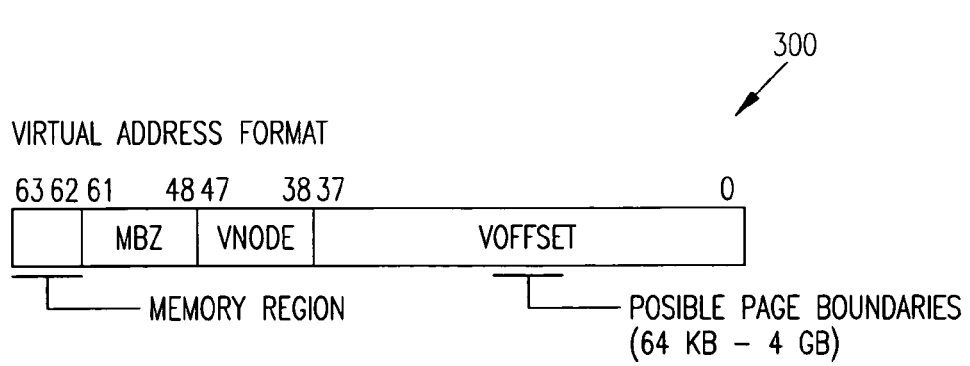
FIG. 3 illustrates a format for a virtual memory address, according to one embodiment of the present invention.

FIG. 3 illustrates a format for a virtual memory address, according to one embodiment. In this embodiment, virtual memory address format 300 contains a 64-bit virtual address space. Bits 37..0 represent a virtual offset into virtual memory space, wherein potential page boundaries range from 64 KB to 4 GB. Bits 47..38 represent the VNode (i.e., virtual node). This is used by the hardware when performing remote address translation. Bits 61..48 must be set to zero in this implementation. Bits 63..62 specify the memory region, which determines the type of address translation used in kernel mode. The virtual address space can be considered a flat virtual address space for uniprocessor, or symmetric multiprocessing applications. As stated, this embodiment supports eight page sizes ranging from 64 KB to 4 GB. Thus, the page boundary can vary, from between bits 15 and 16, to between bits 31 and 32.

In various embodiments of the invention, virtual addresses used for instruction fetches and data references are first translated into physical addresses before memory is accessed. These embodiments support two forms of address translation: source translation, and remote translation. The first form of address translation is source translation, in which a virtual address is fully translated by a Translation Look-aside Buffer (TLB) on a local P chip to a physical address on an arbitrary node. The second form of address translation is remote translation, in which the physical node number is determined by a simple translation of the virtual address VNode field, and the remaining virtual address VOffset field is sent to the remote node to be translated into a physical address offset via a Remote-Translation Table (RTT). The type of address translation performed is based upon values in a configuration control register and the virtual address itself. Remote translation is performed if all of the following three conditions are true: (1) Remote translation is enabled (e.g., a flag contained in the configuration control register is set); (2) The virtual address is to the useg region (Bits 63..62=00 in the virtual address); and (3) The virtual address references a remote node (Bits 47..38 in the virtual address are not equal to a local node value contained in the configuration control register). If any of the above conditions are false, then source translation is performed. Remote translation can be enabled/disabled on a per-processor basis.

Figure 4:
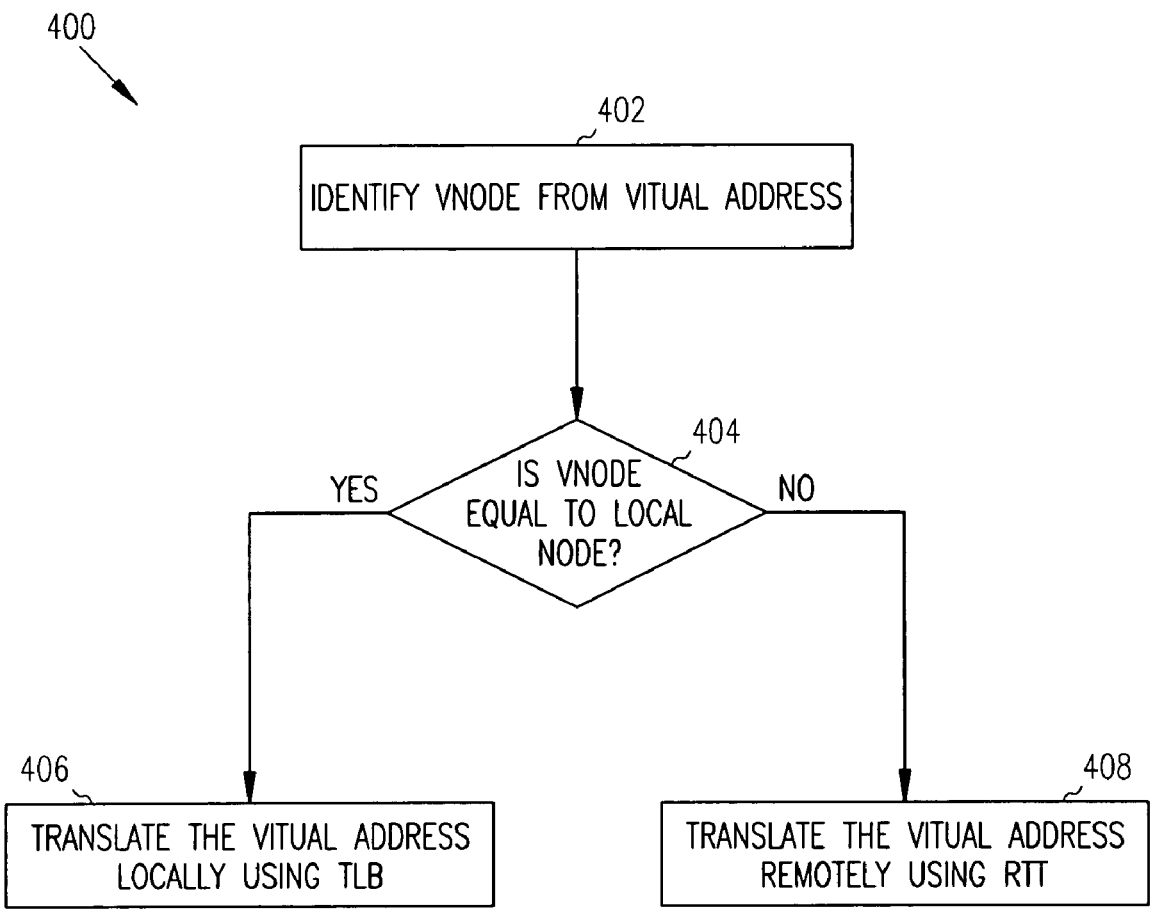
FIG. 4 illustrates a flow diagram for analyzing a VNode field in the virtual memory address, according to one embodiment of the present invention.

FIG. 4 illustrates a flow diagram for analyzing a VNode field in the virtual memory address, according to one embodiment of the present invention. Flow diagram 400 includes blocks 402, 406, and 408, and also includes checkpoint 404. Flow diagram 400 illustrates one way in which a virtual memory address can be translated into a physical memory address (in either local or remote memory space). Block 402 includes identifying the virtual node from a virtual address. In one implementation, a local node can identify the virtual node by looking at the VNode field of the virtual address. Checkpoint 404 determines if the virtual node is the same as, or equal to, the local node. If so, flow diagram 400 continues to block 406, wherein the virtual address is translated into a physical address locally using a Translation Look-Aside Buffer (TLB). The local node is then able to address local physical memory space. If the virtual node is not the same as the local node, then flow diagram 400 continues to block 408, wherein the virtual address is translated into a physical address remotely (on a remote node) using a Remote-Translation Table (RTT). In this fashion, the local node is effectively able to address remote memory space of the remote node.

Figure 5:
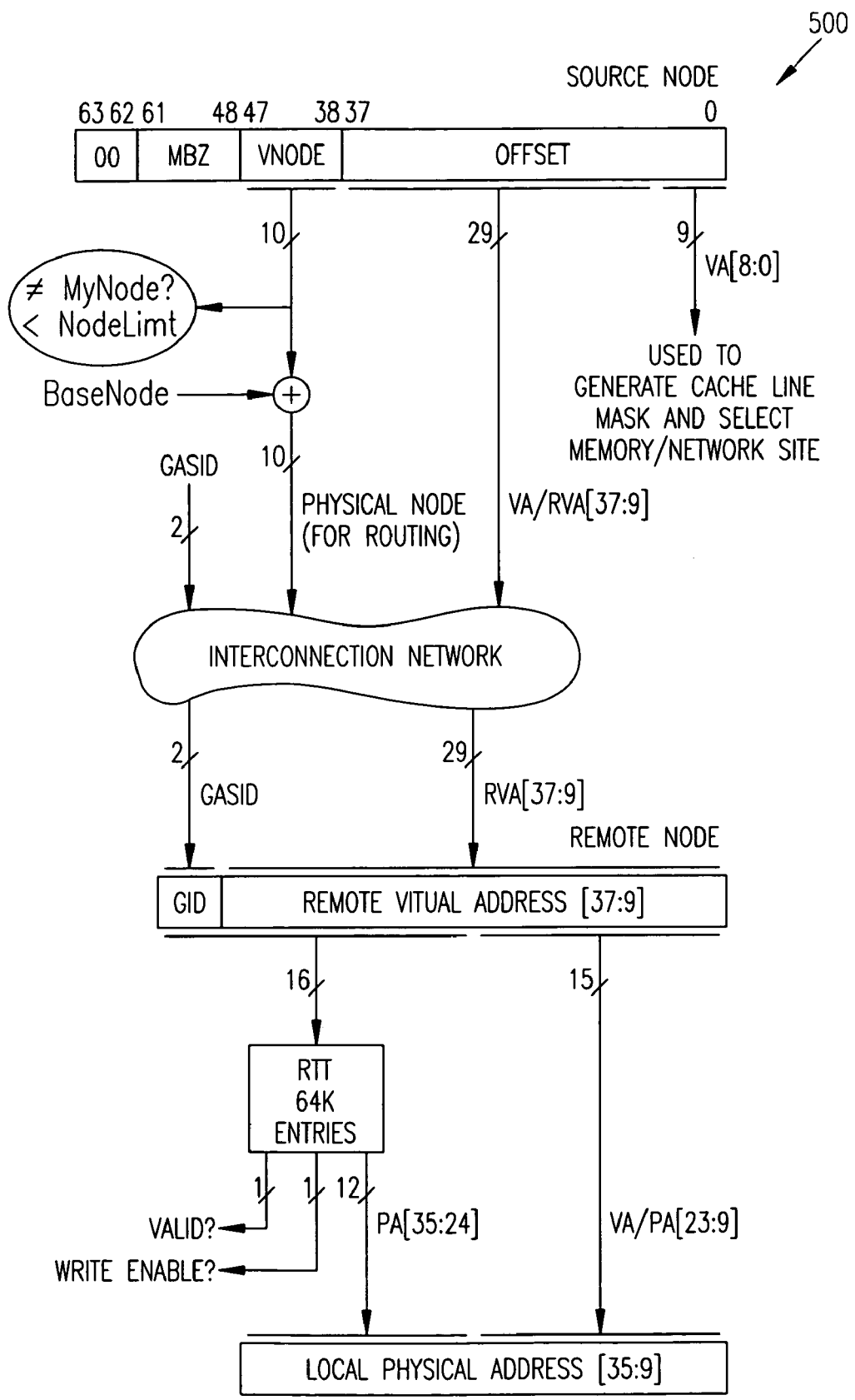
FIG. 5 illustrates a detailed flow diagram for implementing remote translation of a virtual memory address, according to one embodiment of the present invention.

FIG. 5 illustrates a detailed flow diagram 500 for implementing remote translation of a virtual memory address, according to one embodiment of the present invention. When remote translation is enabled, the hardware treats bits 47..38 of the Virtual Address (i.e., VA47..38, for the VNode field) as a virtual node number. As described above, all use virtual addresses with a VNode value not matching the local virtual node number are translated remotely. Additionally, the address is checked to make sure it does not exceed the user's partition defined by the NodeLimit field in the TLBcontrol register. If VA47..38>NodeLimit, then an Address Error exception occurs.

The physical node number for the address is computed by adding VA47..38 to the BaseNode value from the TLBcontrol register. (In this instance, the BaseNode is a reference mechanism by which the physical node number can be computed.) Overflow on this 10-bit addition is ignored; the OS must never create a partition (via the BaseNode and NodeLimit values) that exceeds the number of nodes in the machine. The virtual address Offset field (VA37..0) is sent to the resulting physical node as an Aremote virtual address@ (RVA) to complete the translation. (The RVA could also be referred to as a remote virtual memory address.) The cache allocation is forced to non-allocate and the reference is not cached (Get/Put semantics).

The value of the BaseNode is unique to each node. This creates a unique physical node mapping when adding the BaseNode to the VNode field. Therefore, in one implementation, various nodes can use common, contiguous VNodes (starting at 0, for example) to effectively reference different physical nodes (that are used for routing). Table 1 below illustrates an example of physical (destination) node mapping for three different source nodes A, B, and C.

TABLE 1

Physical Node Calculation

| Source Node | VNode | Physical Node |
|---|---|---|
| A | 0 | 100 |
| (Base Node = 100) | | |
| A | 1 | 101 |
| A | 2 | 102 |
| B | 0 | 200 |
| (Base Node = 200) | | |
| B | 1 | 201 |
| B | 2 | 202 |
| C | 0 | 300 |
| (Base Node = 300) | | |
| C | 1 | 301 |
| C | 2 | 302 |

In another embodiment, a look-up table is used to determine the physical node. In this embodiment, the BaseNode calculation is not required.

RVA requests bypass the Ecache (in the E chips), since they can never be cached. The M chips contain a set of four, 2-bit Global Address Space ID (GASID) registers, one for each of the local MSP's. When the local M chip sends a packet out the network with an RVA, it includes the value of the two bit GASID for the originating MSP. This is used to qualify the remote translation of the RVA at the destination M chip. Thus, the 2-bit GASID, and the RVA, are routed through the interconnection network. Bits 8..0 of the virtual address are not routed as such, because bits 8..5 are used to select the memory/network slice, and bits 4..0 are used to generate the cache line word mask. The cache line mask is unneeded for the remote translation mechanism, and the slice information is also unneeded, since the remote transfer operations have an implied slice (from an M chip on one node to a corresponding M chip on the remote node).

At the remote M chip, remote virtual addresses go through a translation to a pure physical address. This translation takes place before presenting the packet to the directory protocol engine. Remote translation takes place with a granularity of 16 MB. The two GASID bits, and bits 37..24 of the RVA, are used to index into a 64K-entry Remote-Translation Table (RTT). Each entry of this table contains a valid bit, a write-enable bit, and a 12-bit value representing PA35..24 (the 16 MB physical page frame). These bits are appended to the lower bits of the RVA to form a physical memory address at the remote node. The valid bit is used for status of the translation. The valid bit indicates whether the RTT was able to translate the virtual memory address into a valid physical memory address space on the remote node.

The write-enable bit, or flag, indicates whether a write is permitted to a region referenced by the virtual memory address. A write to this region will only be allowed if the write-enable bit is set.

In one embodiment, the RVA is formed from one or more portions of the virtual address having the VNode field. In another embodiment, the RVA includes a virtual memory address, wherein the virtual memory address is translated into a physical memory address using the RTT.

Figure 6A:
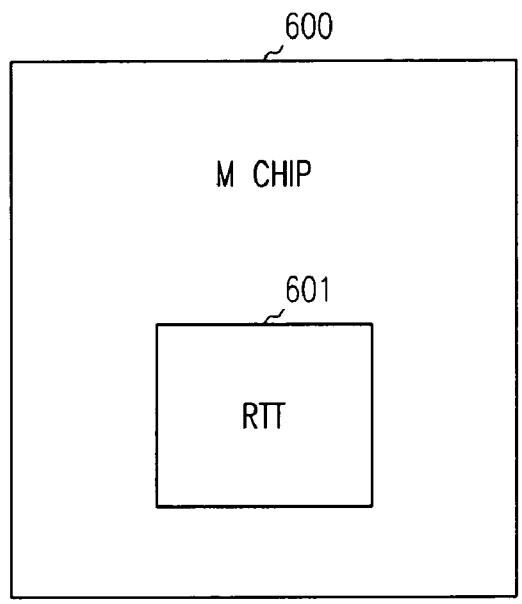
FIG. 6A illustrates a block diagram of a remote-translation table (RTT) resident on an M chip, according to one embodiment of the present invention.

FIG. 6A illustrates a block diagram of a remote-translation table (RTT) resident on an M chip, according to one embodiment of the present invention. M chip 600 on a given node in a multi-node system includes RTT 601.

Figure 6B:
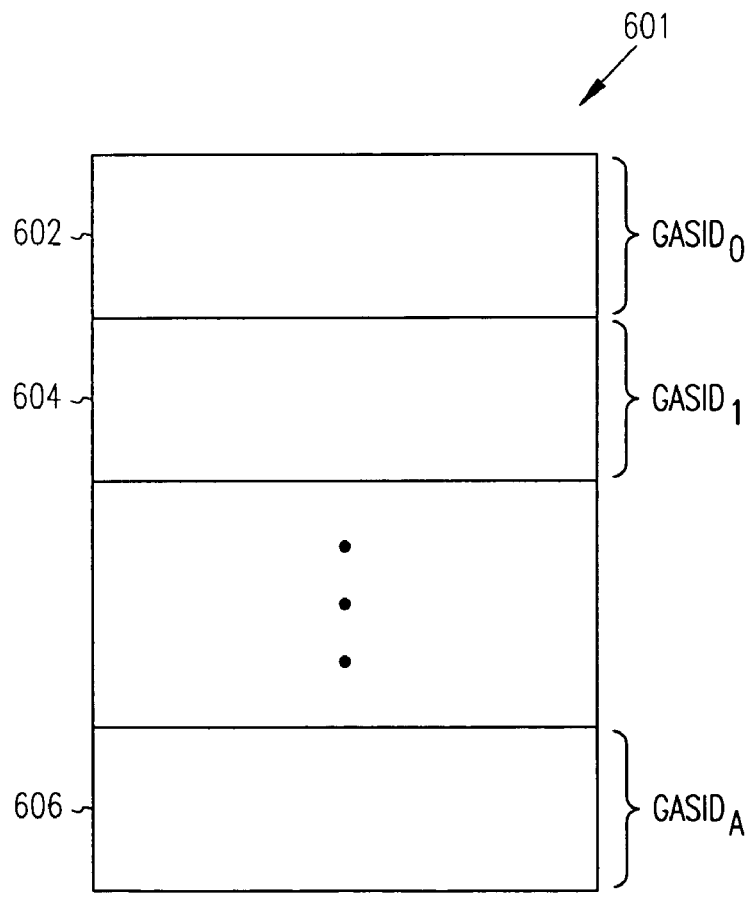
FIG. 6B illustrates a more detailed diagram of the RTT shown in FIG. 6A, according to one embodiment of the present invention.

FIG. 6B illustrates a more detailed diagram of the RTT shown in FIG. 6A, according to one embodiment on the invention. RTT 601 is indexed by a GASID and high-order bits of an RVA. The GASID comprises the highest-order bits of the index into RTT 601. RTT 601 is partitioned into various sections. Because the GASID comprises the highest-order bits, this embodiment shows RTT 601 being partitioned into sections corresponding to the different GASID's. In one implementation, these GASID's are associated with specific applications (or processors) operating on a MSP. RTT 601 includes section 602 for translation information corresponding to $GASID_0$ (at the top of RTT 601). Section 602 will not necessarily include translation information that is contiguous (i.e., in order). The information will be ordered as it is implemented by the application use for $GASID_0$. RTT 601 contains translation information for the entire virtual memory address space for the node on which it resides, and therefore not all of the information in section 602 is used, or contiguous (if used). Section 604 includes translation information corresponding to $GASID_1$, and section 606 includes translation information corresponding to $GASID_A$.

In one implementation, the index into RTT 601 includes 2 high-order bits for the GASID, and 14 high-order bits from the RVA, thereby producing a 16-bit index into RTT 601. In this implementation, there are four GASID's (from the 2 GASID bits), and therefore A is equal to 3. RTT 601 includes 64K entries ($2^{16}$), and each of sections 602, 604, and 606 includes 16K entries, wherein not all of the entries are necessarily applicable, or used, for the remote translation mechanism.

Figure 6C:
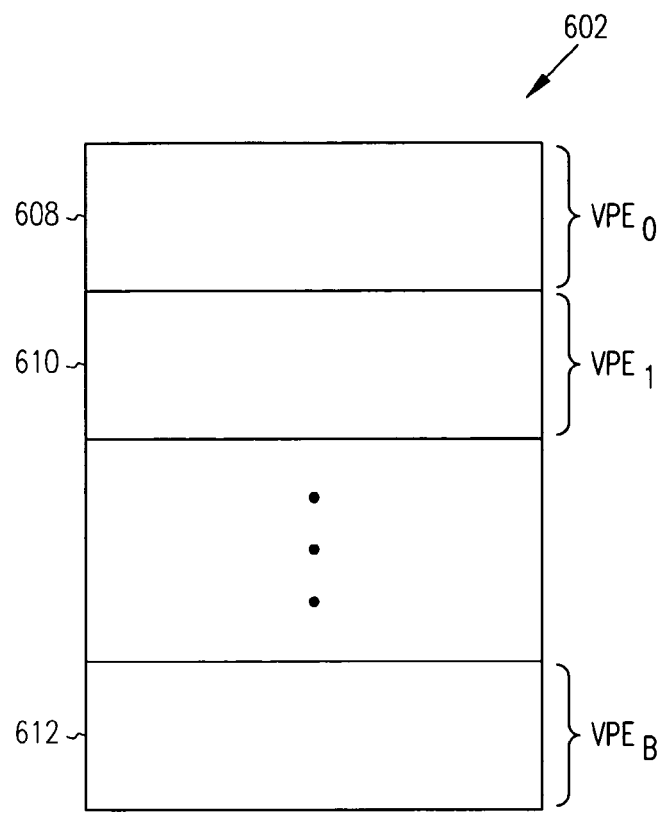
FIG. 6C illustrates a more detailed view of a portion of the RTT shown in FIG. 6B, according to one embodiment of the present invention.

FIG. 6C illustrates a more detailed view of a portion of the RTT shown in FIG. 6B, according to one embodiment of the invention. FIG. 6C illustrates a detailed view of section 602 (corresponding to $GASID_0$) in RTT 601. In this embodiment, certain high-order bits of the RVA used to index into RTT 601 correspond to virtual processing elements (VPE) on a given node. Translation information is ordered within section 602 according to the VPE to which it is associated. Section 608 includes information corresponding to $VPE_0$. Section 610 includes information corresponding to $VPE_1$, and section 612 includes information corresponding to $VPE_B$.

In one implementation, there are 4 VPE's (in a MSP system), and therefore B is equal to 3. In this implementation, each of sections 608, 610, and 612 includes 4K entries (for this portion of RTT 601).

Figure 6D:
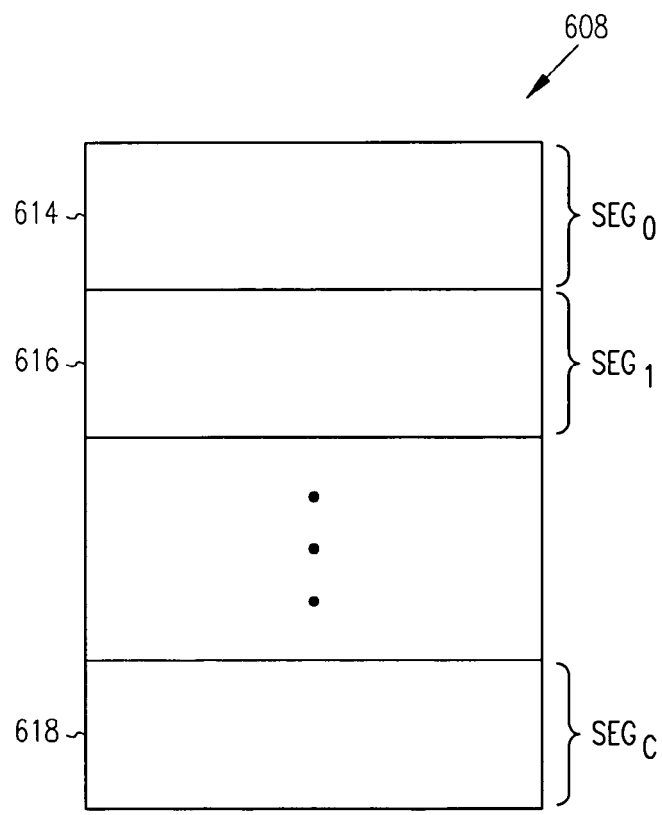
FIG. 6D illustrates an even further detailed view of a portion of the RTT shown in FIG. 6C, according to one embodiment of the present invention.

FIG. 6D illustrates an even further detailed view of a portion of the RTT shown in FIG. 6C, according to one embodiment of the invention. FIG. 6D illustrates a detailed view of section 608 (corresponding to $VPE_0$) in RTT 601. In this embodiment, certain bits of the RVA used to index into RTT 601 correspond to segments. Information is ordered within section 608 according to the segment to which it is associated. Section 614 includes information corresponding to $seg_0$. Section 616 includes information corresponding to $seg_1$, and section 618 includes information corresponding to $seg_C$.

Figure 7:
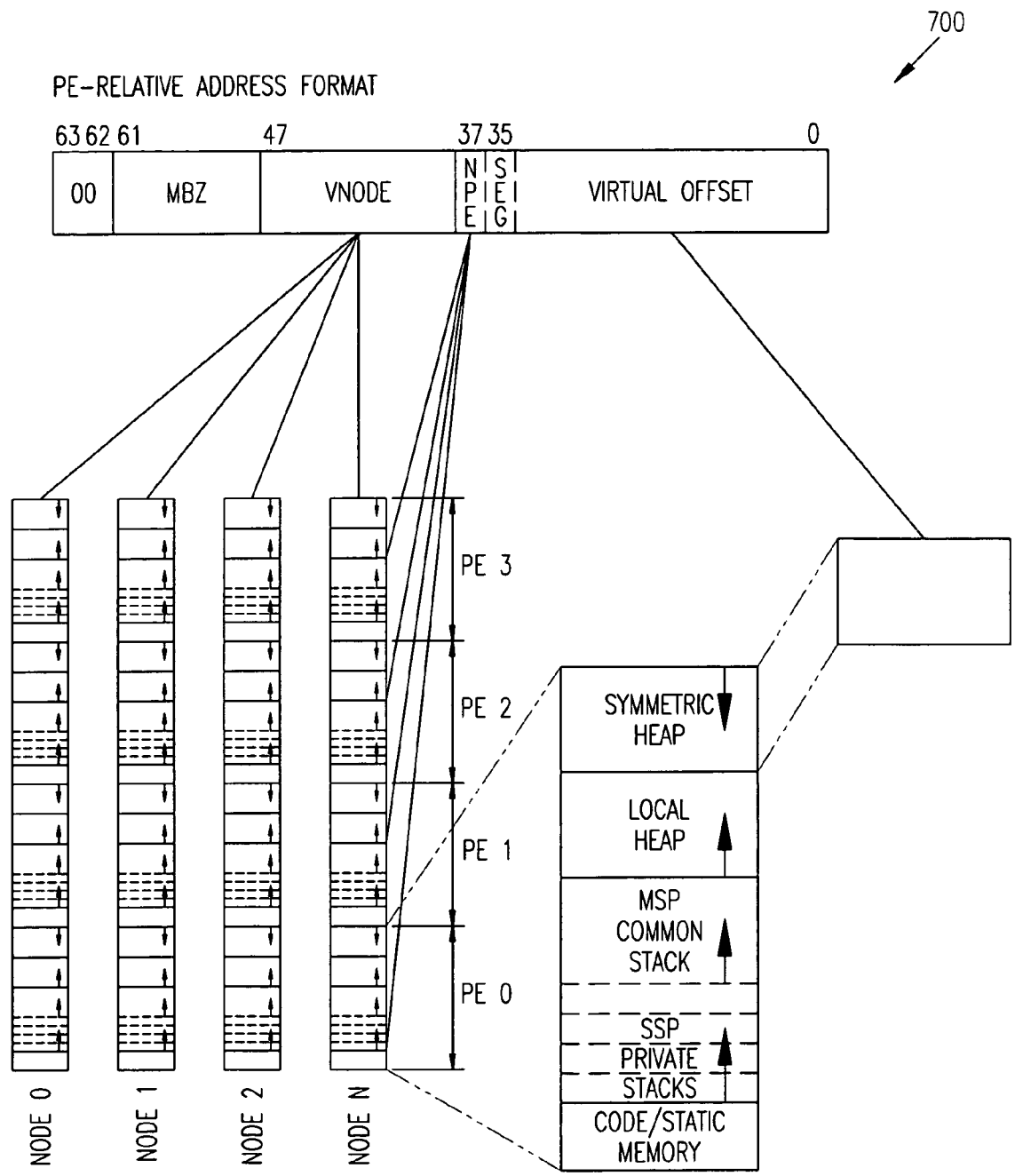
FIG. 7 provides a functional view of a model for routing memory access requests according to an embodiment of present invention.

In some embodiments, a way to think of the remote translation mechanism is as a hardware facility that supports automatically "stitching together" the local address spaces of cooperating tasks on a series of nodes. When remote translation is enabled, the hardware routes memory access requests to the logical nodes indicated in the VNode field of the user address. FIG. 7 provides a functional view of an exemplary embodiment of this routing model.

Using this routing model, it is possible to devise an approach to mapping the processing-element-relative space by first building a series of independent on-node spaces, each consisting of the address spaces for their respective individual processing elements (i.e., one address space per processing element per node), and then combining them into a single contiguous space by enabling remote translation across a job or application. In some embodiments, each of the on-node address spaces are built and managed locally using source mode translation, thus allowing the use of standard memory mapping techniques and APIs for management of this space.

Each of these on-node address spaces are then exported (or broadcast) across the job or application space by loading the local address mappings into the RTT and entering remote translation mode. In some embodiments, it is important for all nodes to synchronize their transition to remote translation mode before resuming normal execution to ensure that valid translations exist for all nodes across the job or application space. In some such embodiments, failure to synchronize the transition to remote translation mode results in unexpected application termination because unsuccessful remote address translations are always fatal on some systems and often fatal on other systems.

Once this address space initialization has completed and the job or application is in normal operation, the operating system is responsible for maintaining coherency of the remote mapping space. The operating system will ensure that all valid local translations for the distributed memory job are loaded in the RTT. This requires that all memory for all local processing elements within the job or application is resident whenever the job is active. In addition, the operating system requires that whenever the memory space for a particular processing element is grown, it is grown on the processing element's local node. Doing so allows the operating system to use its normal methodology for handling memory growth within distributed memory jobs. After growing the processing element's address space locally as requested, the RTT can be updated, making the new space available to remote processing elements within the job or application.

Figure 8:
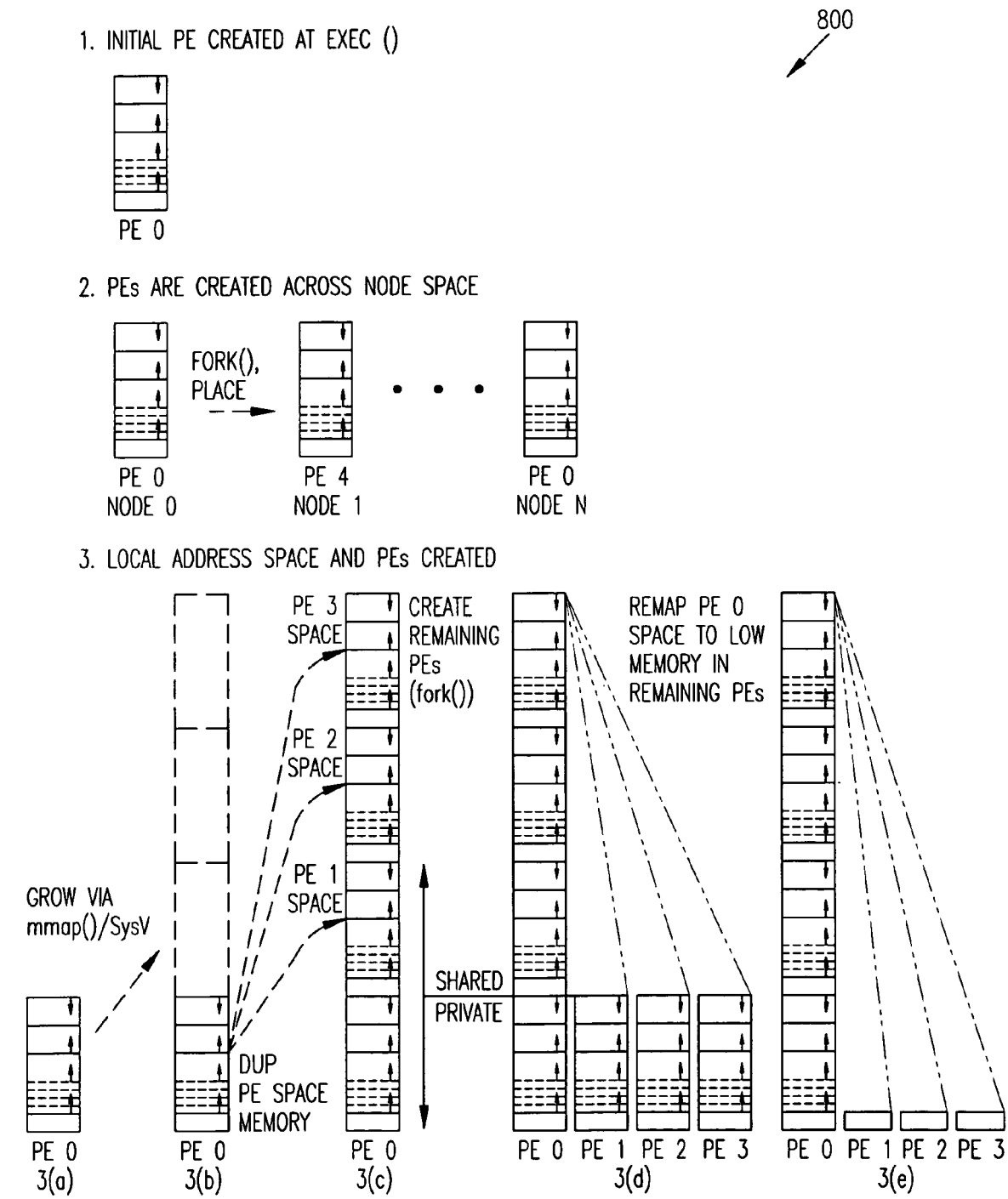
FIG. 8 provides a method for construction of a distributed address space according to an embodiment of the present invention.

FIG. 8 shows an exemplary embodiment 800 of how a distributed address space is constructed according to one embodiment of the present invention. Step 1 of the example 800 shows the layout of the initial processing element's address space. In Step 2, the initial processing element copies itself and places children, one per node, across the node space of the job. Step 3 shows the continuation of the example 800 by illustrating the construction of the local address and processing element space on Node 0. As shown in steps 3b and 3c of this example 800, the address space for the processing elements local to this node is built using standard memory APIs. Step 3d then creates the remaining processing elements. The example 800 keeps processing element 0's memory private during this step to allow each processing element to complete its initialization in a protected address space.

Figure 9:
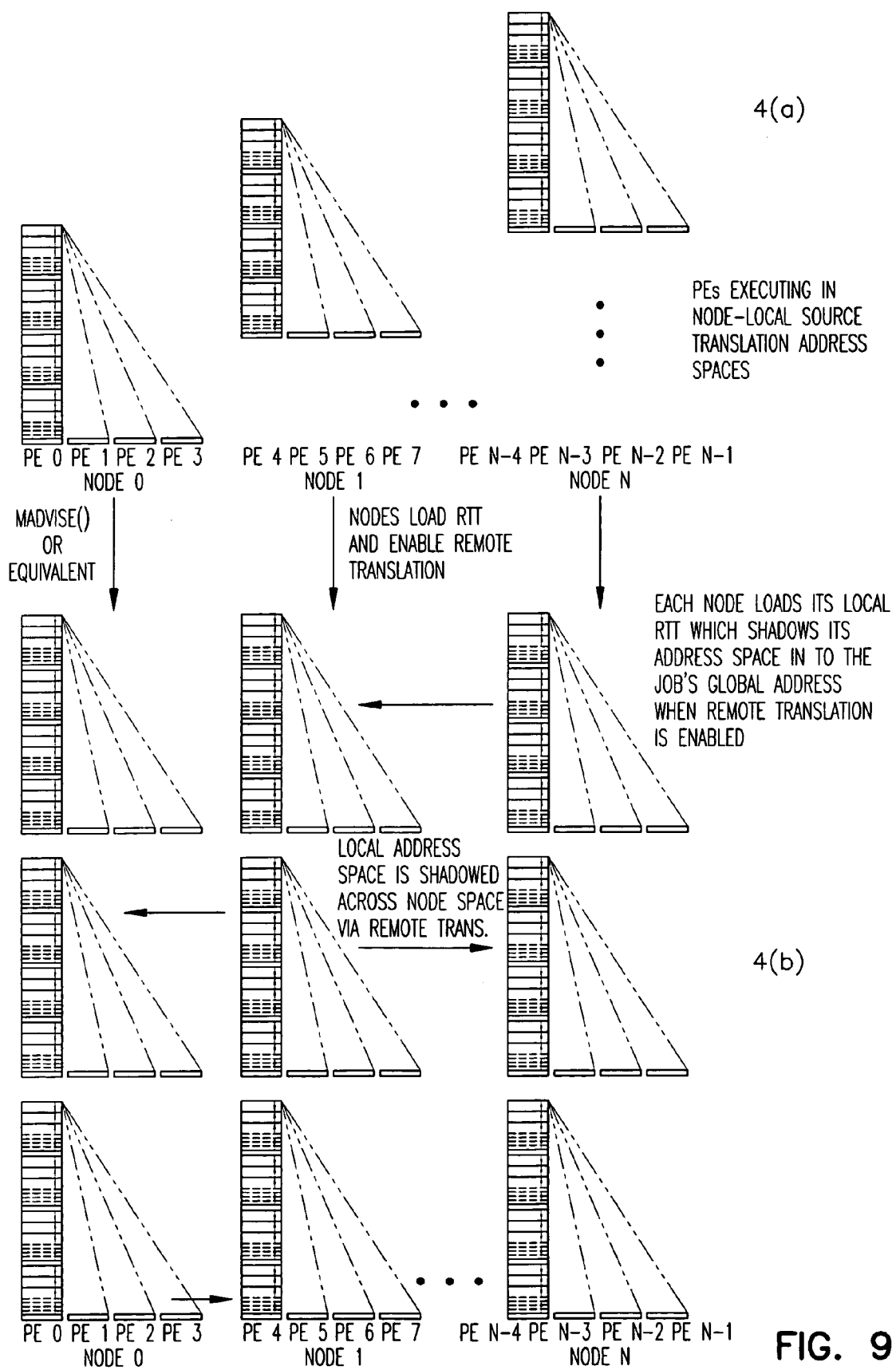
FIG. 9 provides a flow diagram of RTT aggregation according to an embodiment of the present invention.

At this point the on-node processing element and memory space initialization is complete and the component node spaces are ready to combine into the desired aggregate. FIG. 9 illustrates one embodiment of how this aggregation is performed.

Once the local address spaces have been constructed on the respective nodes, a representative processing element from each node group will request the operating system to load the remote translation table and enable remote translation mode. FIG. 9 shows one embodiment of how this is performed. In step 4a the independent node address spaces are shown. Note that each has been offset during its initialization based on its place within the global job space and according to the programming environment's distributed memory addressing model. In some embodiments, at this point the processing elements on each local node have synchronized with one another and are prepared to enter the global address space. This is performed through an API call by each processing element to the operating system that notifies the OS to enable remote translation. In some embodiments, as part of this call, the OS ensures that all local memory for the job or application is resident and translations are loaded in the RTT.

In some such embodiments utilizing synchronization, upon a successful synchronization, the processing element will be executing with remote translation enabled. This is illustrated at step 4b. Because each node/processing element could reach this point at different times, it is prudent in some embodiments for user code to synchronize across processing elements before utilizing remote memory. In some embodiments, failure to do so could have undesired results including job or application fatal errors or, in some other further embodiments, fatal kernel errors.

In some embodiments, once the job or application is in normal operation in remote translation mode, the operating system will handle requests to change the address space configuration on a node-local basis. For example, in some embodiments, auto-grow-regions which are in the address space must be grown on the node to which they were mapped. In some such embodiments this allows the maintenance of normal mapping semantics by the operating system. In some additional embodiments, once in remote translation mode, any attempt to modify the address space of a distributed application outside scope of the local node will either fail or cause the job or application to terminate.

Figure 10:
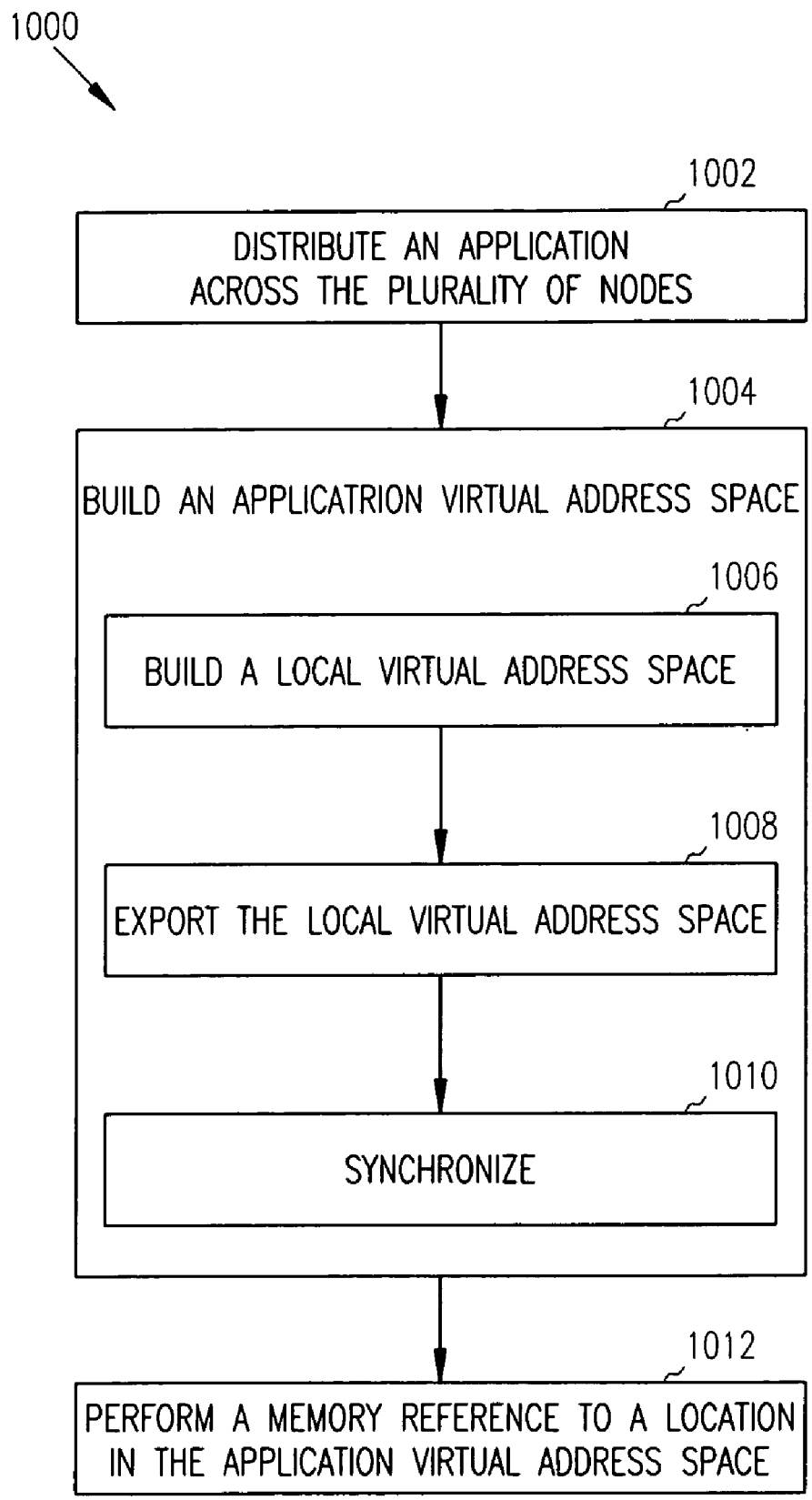
FIG. 10 shows a flow diagram of a method according to an embodiment of the present invention.

One aspect of the present invention shown in FIG. 10 includes a method 1000 of accessing shared memory in a computer system having a plurality of nodes, including a first node, wherein each node includes a processor and local memory. In some embodiments, this method 1000 includes distributing 1002 an application across the plurality of nodes and building 1004 an application virtual address space. In some such embodiments, building 1004 an application virtual address space includes building 1006 a local virtual address space for the application in each of the plurality of nodes, wherein the local virtual address space translates a virtual address generated by the application executing on that node to a physical address in local memory for that node, and exporting 1008 the local virtual address space for each node to a Remote Translation Table (RTT) associated with that node. This aspect of the present invention further includes performing 1012 a memory reference to a memory location in the application virtual address space, wherein performing 1012 a memory reference to a memory location in the application virtual address space includes translating bits of the application virtual address into a node address associated with the first node and translating bits of the application virtual address using the RTT associated with the first node. In some further embodiments, the local address space is read from a Translation Look-aside Buffer (TLB). Yet further embodiments of the method 1000 include optionally performing 1010 a synchronization operation that causes at least some of the plurality of nodes to wait for all nodes to complete exporting their respective local virtual address spaces.

Figure 11:
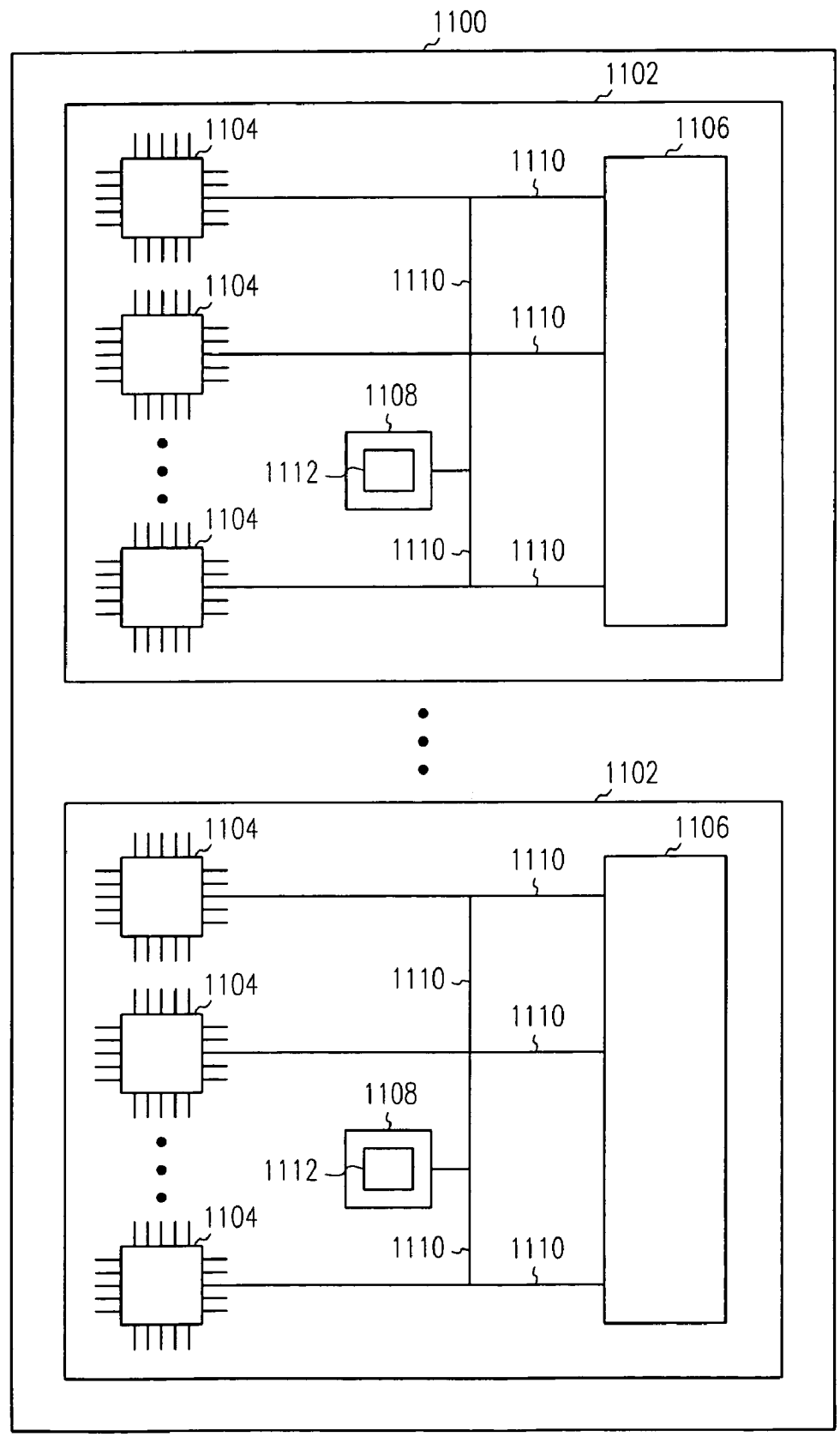
FIG. 11 shows a perspective view of a system according to an embodiment of the present invention.

Another aspect of the present invention shown in FIG. 11 provides a system 1100 for remote address translation on a multinode system 1100 capable of distributing an application, job, or process across multiple nodes 1102. In some embodiments, the system 1100 includes a plurality of nodes 1102, each node 1102 having one or more processors 1104, a memory 1106, and a memory controller 1108 operatively coupled 1110 to the memory 1108 and the one or more processors 1104. In some such embodiments, the memory controller 1108 includes a Remote Translation Table (RTT) 1112, wherein the RTT 1112 translates a virtual address received as part of a memory request received from another node 1102 into a memory request with physical addresses into the memory 1106 on the node 1102 associated with the RTT

1112. Further within some of these embodiments, the RTT 1112 is initialized upon the start of an process associated with an application or process by building a virtual to physical address translations for local virtual address space in the node 1102 corresponding to the application, and exporting the virtual to physical address translations for the local virtual address space from the node 1102 to the RTT 1112 associated with that node 1102. In some embodiments, each of the plurality of nodes 1102 executes a synchronization operation that causes at least some of the plurality of nodes 1102 to wait for all of the plurality of nodes 1102 to complete exporting the virtual to physical address translations to their respective RTT's 1112.

Yet another aspect of the present invention provides a device-readable medium having instructions thereon that cause a properly programmed device to perform a method of accessing shared memory in the device. In some embodiments, the instructions, when executed on a properly programmed information-processing device having a plurality of nodes, including a first node, each node having one or more processors, a memory, and a memory controller and coupled to the memory and the one or more processors, cause the information-processing device to distribute an application across the plurality of nodes and build an application virtual address space. In some such embodiments, building an application virtual address space includes building a local virtual address space for the application in each of the plurality of nodes, wherein the local virtual address space translates a virtual address generated by the application executing on that node to a physical address in local memory for that node, and exporting the local virtual address space for each node to a Remote Translation Table (RTT) associated with that node. In some embodiments, the instructions, when executed further include performing a memory reference to a memory location in the application virtual address space, wherein performing a memory reference to a memory location in the application virtual address space includes translating bits of the application virtual address into a node address associated with the first node and translating bits of the application virtual address using the RTT associated with the first node. In some embodiments, building a local virtual address space further includes performing a synchronization operation that causes at least some of the plurality of nodes to wait for all nodes complete exporting their respective address space. In some further embodiments, the local address space is read from a Translation Look-aside Buffer (TLB).

Still another aspect of the present invention provides a multinode system for implementing remote address translation. Some embodiments of the multinode system include a plurality of nodes, including a first node. In some such embodiments, each of the plurality of nodes includes one or more processors, a memory, and a memory controller operatively coupled to the memory and the one or more processors. These embodiments include a means for distributing an application across the plurality of nodes and a means for building an application virtual address space. In various embodiments, the means for building an application virtual address space includes a means for building a local virtual address space for the application in each of the plurality of nodes, wherein the local virtual address space translates a virtual address generated by the application executing on that node to a physical address in local memory for that node and a means for exporting the local virtual address space for each node to a Remote Translation Table (RTT) associated with that node. Some further embodiments include a means for performing a memory reference to a memory location in the application virtual address space, wherein performing a memory reference to a memory location in the application virtual address space includes a means for translating bits of the application virtual address into a node address associated with the first node, and a means for translating bits of the application virtual address using the RTT associated with the first node. In some such embodiments, building an application virtual address space further includes a means for performing a synchronization operation that causes at least some of the plurality of nodes to wait for all nodes to complete exporting their respective local virtual address spaces.

As described herein, the various embodiments of the present invention provide a number of advantages. For example, an RTT provides a scalable address translation mechanism, and is designed to avoid translation faults in large systems (unlike a regular TLB design). The RTT supports full mapping of all the memory in a machine (unlike various networking cards) to allow full load/store access to all the memory in the system. Such a system allows each node to independently manage its own virtual-to-physical memory mapping. Such a system also removes the need to implement conventional TLB "shootdown." Conventional TLB "shootdown" occurs when a node changes a local virtual-to-physical page mapping, and has to invalidate all of the TLB entries throughout the system that contain that mapping. The use of an RTT that supports full mapping removes the need to implement such an approach. These and other advantages are provided for by various embodiments of the present invention.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of accessing shared memory in a computer system having a plurality of nodes, wherein each node includes a processor, a Translation Look-aside Buffer (TLB) associated with the processor and local memory wherein the local memory of each node includes a Remote Translation Table (RTT), the method comprising:
   distributing an application across the plurality of nodes;
   building an application virtual address space in each of the plurality of nodes, wherein building an application virtual address space includes:
      building a local virtual address space for the application in each of the plurality of nodes, wherein the local virtual address space translates a virtual address generated by the application executing on that node to a physical address in local memory for that node, wherein the virtual address generated by the application executing on the node includes a node number of the node;
      determining whether remote translation should be enabled; and
      if remote translation should be enabled, exporting the local virtual address space for each local node to the RTTs in each of the plurality of nodes, wherein exporting includes:
         requesting that the operating system on each node of the plurality of nodes enable remote translation; and
         shadowing the local virtual address spaces for each node across the plurality of nodes;
   if remote translation is enabled, translating a virtual memory reference to a physical memory address using the application virtual address space in the local RTT in each of the plurality of nodes, wherein translating the virtual memory reference includes translating in a source node the node number of the application virtual address into a node address associated with a remote node of the plurality of nodes and translating bits of the application virtual address into a physical page address for the remote node; and if remote translation is not enabled, sending the virtual memory reference to the remote node and translating the virtual memory reference into a physical address in local memory for the remote node using the local virtual address space in the RTT on the remote node.

2. The method of claim 1, wherein the local virtual address space is read from the Translation Look-aside Buffer (TLB) on the node.

3. The method of claim 1, wherein building an application virtual address space further includes performing a synchronization operation that causes at least some of the plurality of nodes to wait for all nodes to complete exporting their respective local virtual address spaces.

4. A system comprising:
a plurality of nodes, each node including:
one or more processors having a Translation Look-aside Buffer (TLB);
a memory; and
a memory controller operatively coupled to the memory and the one or more processors, wherein the memory controller includes a Remote Translation Table (RTT),
wherein the RTT is initialized upon the start of a process associated with an application by building virtual to physical address translations for local virtual address space in the node corresponding to the application, wherein each virtual address includes a node number of the node, and if remote translation should be enabled, by exporting the virtual to physical address translations for the local virtual address space from the node to the RTT in each of the plurality of nodes associated with that node through the application, wherein exporting includes:
requesting that the operating system on each node of the plurality of nodes enable remote translation; and
shadowing the local virtual address spaces for the node across the plurality of nodes;
wherein the TLB translates a virtual address reference received from the local node into a physical address in the memory for the local node, if the node number for the virtual address is the local node number;
wherein, if remote translation is enabled, the RTT translates the virtual address received from the local node into a physical address in the memory for a remote node associated with the local node through the application using the virtual to physical address translations for the local virtual address space exported from the remote node; and
wherein, if remote translation is not enabled, the RTT sends the virtual address received from the local node to the remote node and has the RTT on the remote node translate the virtual address into a physical addresses in the memory for the remote node using the virtual to physical address translation for the local virtual address space in the remote node.

5. The system of claim 4, wherein each of the plurality of nodes executes a synchronization operation that causes at least some of the plurality of nodes to wait for all of the plurality of nodes to complete exporting the virtual to physical address translations to their respective Remote Translation Tables.

6. A device-readable medium having instructions thereon that, when executed on a properly programmed information-processing device having a plurality of nodes, each node having one or more processors with a Translation Look-aside Buffer (TLB), a memory, and a memory controller coupled to the memory and the one or more processors, causes the information-processing device to perform a method comprising:
distributing an application across the plurality of nodes;
building an application virtual address space in each of the plurality of nodes, wherein building an application virtual address space includes:
building a local virtual address space for the application in each of the plurality of nodes, wherein the local virtual address space translates a virtual address generated by the application executing on that node to a physical address in local memory for that node, wherein the virtual address generated by the application executing on the node includes a node number of the node;
determining whether remote translation should be enabled; and
if remote translation should be enabled, exporting the local virtual address space for each local node to the RTTs in each of the plurality of nodes, wherein exporting includes:
requesting that the operating system on each node of the plurality of nodes enable remote translation; and
shadowing the local virtual address spaces for each node across the plurality of nodes;
if remote translation is enabled, translating a virtual memory reference to a physical memory address using the application virtual address space in the local RTT in each of the plurality of nodes, wherein translating the virtual memory reference includes
translating in a source node the node number of the application virtual address into a node address associated with a remote node of the plurality of nodes and translating bits of the application virtual address into a physical page address for the remote node; and
if remote translation is not enabled, sending the virtual memory reference to the remote node and translating the virtual memory reference into a physical address in local memory for the remote node using the local virtual address space in the RTT on the remote node.

7. The device-readable medium of claim 6, wherein building a local virtual address space further includes performing a synchronization operation that causes at least some of the plurality of nodes to wait for all nodes complete exporting their respective address space.

8. The device-readable medium of claim 6, wherein the local virtual address space is read from the Translation Look-aside Buffer (TLB) on the node.

9. A multinode system for implementing remote address translation, the system comprising:
a plurality of nodes, each of the plurality of nodes including:
one or more processors with a Translation Look-aside Buffer (TLB);
a memory; and
a memory controller operatively coupled to the memory and the one or more processors, wherein the memory controller includes:
a Remote Translation Table (RTT);
means for distributing an application across the plurality of nodes;
means for building an application virtual address space in each of the plurality of nodes, wherein the means for building an application virtual address space includes:
means for building a local virtual address space for the application in each of the plurality of nodes, wherein the local virtual address space translates a virtual address generated by the application executing on that node to a physical address in local memory for that node, wherein the virtual address includes a node number of the node;

means for determining whether remote translation should be enabled; and means for, if remote translation should be enabled, exporting the local virtual address space for each local node to the RTT in each of each the plurality of nodes, wherein means for exporting includes:

means for requesting that the operating system on each node of the plurality of nodes enable remote translation; and means for shadowing the local virtual address spaces for each node across the plurality of nodes;

means for translating the virtual memory reference into a physical address in local memory using the TLB on the local node, if the node number is the local node number;

means for, if remote translation is enabled, translating a virtual memory reference to a physical memory address using the application virtual address space in the local RTT in each of the plurality of nodes wherein means for translating the virtual memory reference includes means for translating in a source node the node number of the application virtual address into a node address associated with a remote node of the plurality of nodes and translating bits of the application virtual address into a physical page address for the remote node; and means for, if remote translation is not enabled, sending the virtual memory reference to the remote node and translating the virtual memory reference into a physical address in local memory for the remote node using the local virtual address space in the RTT on the remote node.

10. The multinode system of claim 9, wherein means for building an application virtual address space further includes means for performing a synchronization operation that causes at least some of the plurality of nodes to wait for all nodes to complete exporting their respective local virtual address spaces.

11. A multi-node system for implementing remote address translation, the system comprising:

a network;

a source node coupled to the network, wherein the source node includes a first remote-translation table (RTT); and a remote node coupled to the network, wherein the remote node includes a second RTT;

wherein on the remote node the second RTT is built using a first local address space on the source node exported from the source node to the remote node using an operating system call to perform the export;

wherein on the source node the first RTT is built using a second local address space on the remote node exported from the remote node to the source node using the operating system call to perform the export;

wherein the operating system enables remote translation utilizing the first and second RTTs, wherein enabling remote translation utilizing the first and second RTTs includes having the remote node translate a virtual memory address associated with the source node to a physical address on the source node as a function of the second RTT and having the source node translate a virtual memory address associated with the remote node to a physical address on the remote node as a function of the first RTT; and wherein both the first and second RTTs include one or more virtual addresses and each virtual address includes a node number of a remote node that built the virtual address.

12. The method of claim 1, wherein requesting the operating system on each node of the plurality of nodes enable remote translation passes control of the RTT to the operating system.

13. The method of claim 12, wherein passing control of the RTT to the operating system causes the operating system to maintain coherency of the RTT.

14. The system of claim 4, wherein requesting the operating system on each node of the plurality of nodes enable remote translation passes control of the RTT to the operating system.

15. The system of claim 14, wherein passing control of the RTT to the operating system causes the operating system to maintain coherency of the RTT.

16. The device-readable medium of claim 6, wherein requesting the operating system on each node of the plurality of nodes enable remote translation passes control of the RTT to the operating system.

17. The device-readable medium of claim 16, wherein passing control of the RTT to the operating system causes the operating system to maintain coherency of the RTT.

18. The method of claim 1, wherein requesting the operating system on each node of the plurality of nodes enable remote translation handles requests to changes the application virtual address space configuration on a node-local basis, wherein handling requests includes disallowing an attempt to modify the application virtual address space outside scope of the local node.

19. The system of claim 4, wherein, when remote translation is enabled, the operating system on each node of the plurality of nodes handles requests to changes the application virtual address space configuration on a node-local basis, wherein handling requests includes disallowing an attempt to modify the application virtual address space outside scope of the local node.

20. The device-readable medium of claim 6, wherein requesting the operating system on each node of the plurality of nodes enable remote translation handles requests to changes the application virtual address space configuration on a node-local basis, wherein handling requests includes disallowing an attempt to modify the application virtual address space outside scope of the local node.

21. The system of claim 9, wherein, when remote translation is enabled, the operating system on each node of the plurality of nodes handles requests to changes the application virtual address space configuration on a node-local basis, wherein handling requests includes disallowing an attempt to modify the application virtual address space outside scope of the local node.

22. The system of claim 11, wherein, when remote translation is enabled, the operating system on each node of the plurality of nodes handles requests to changes the application virtual address space configuration on a node-local basis, wherein handling requests includes disallowing an attempt to modify the application virtual address space outside scope of the local node.

* * * * *

UNITED STATES PATENT AND TRADEMARK OFFICE
CERTIFICATE OF CORRECTION

PATENT NO.       : 7,577,816 B2
APPLICATION NO.  : 10/643758
DATED            : August 18, 2009
INVENTOR(S)      : Sheets et al.

It is certified that error appears in the above-identified patent and that said Letters Patent is hereby corrected as shown below:

On the Title Pg. Item (56) on Page 2, under "U.S. Patent Documents", line 63, below "7191444  3/2007  Alverson et al." insert -- 7,243,211  7/2007  Kohn, J. R. --.

On Sheet 1 of 11, in Fig. 1, line 1, after "M13" delete "M15" and insert -- M14 --, therefor.

On Sheet 2 of 11, in Fig. 3, line 4, delete "POSIBLE" and insert -- POSSIBLE --, therefor.

On Sheet 3 of 11, in Fig. 4 (Box. 402), line 1, delete "VITUAL" and insert -- VIRTUAL --, therefor.

On Sheet 3 of 11, in Fig. 4 (Box. 406), line 5, delete "VITUAL" and insert -- VIRTUAL --, therefor.

On Sheet 3 of 11, in Fig. 4 (Box. 408), line 5, delete "VITUAL" and insert -- VIRTUAL --, therefor.

On Sheet 4 of 11, in Fig. 4, line 17, delete "VITUAL" and insert -- VIRTUAL --, therefor.

On Sheet 10 of 11, in Fig. 10 (Box. 1004), line 1, delete "APPLICATRION" and insert -- APPLICATION --, therefor.

In column 1, line 54, delete "multimode" and insert -- multinode --, therefor.

In column 2, line 3, delete "space;" and insert -- space. --, therefor.

In column 15, line 10, in Claim 9, after "each of" delete "each".

UNITED STATES PATENT AND TRADEMARK OFFICE
CERTIFICATE OF CORRECTION

PATENT NO. : 7,577,816 B2
APPLICATION NO. : 10/643758
DATED : August 18, 2009
INVENTOR(S) : Sheets et al.

It is certified that error appears in the above-identified patent and that said Letters Patent is hereby corrected as shown below:

In column 15, line 25, in Claim 9, delete "nodes" and insert -- nodes, --, therefor.

Signed and Sealed this

Twenty-ninth Day of December, 2009

David J. Kappos
*Director of the United States Patent and Trademark Office*